United States Patent
Kazemi et al.

(10) Patent No.: US 9,963,529 B1
(45) Date of Patent: May 8, 2018

(54) MULTI REACTOR SOLUTION POLYMERIZATION

(71) Applicant: NOVA Chemicals (International) S.A., Fribourg (CH)

(72) Inventors: Niousha Kazemi, Calgary (CA); Stephen Brown, Calgary (CA); Lawrence VanAsseldonk, Sarnia (CA); XiaoChuan Wang, Calgary (CA); Stephen Salomons, Calgary (CA); Yves Lacombe, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days. days.

(21) Appl. No.: 15/491,135

(22) Filed: Apr. 19, 2017

(51) Int. Cl.
| | |
|---|---|
| C08F 210/16 | (2006.01) |
| C08F 2/06 | (2006.01) |
| C08F 2/38 | (2006.01) |
| B01J 19/18 | (2006.01) |
| C08F 4/642 | (2006.01) |

(52) U.S. Cl.
CPC ......... C08F 210/16 (2013.01); B01J 19/1818 (2013.01); B01J 19/1825 (2013.01); B01J 2219/1941 (2013.01)

(58) Field of Classification Search
CPC ........ C08F 210/16; C08F 2/06; B01J 19/1856
USPC .......................................................... 526/65
See application file for complete search history.

(56) References Cited

U.S. PATENT DOCUMENTS

| | | | |
|---|---|---|---|
| 4,336,352 A | 6/1982 | Sakurai et al. | |
| 5,236,998 A | 8/1993 | Lundeen et al. | |
| 6,127,484 A * | 10/2000 | Cribbs | C08L 23/04 |
| | | | 525/191 |
| 6,713,561 B1 | 3/2004 | Berthold et al. | |
| 7,288,596 B2 | 10/2007 | Kwalk | |
| 7,504,055 B2 | 3/2009 | Kwalk | |
| 8,101,693 B2 | 1/2012 | Van Asseldonk et al. | |
| 9,000,095 B2 | 4/2015 | Berthold et al. | |
| 9,187,627 B2 | 11/2015 | Mehta | |
| 9,234,061 B2 | 1/2016 | Vahteri et al. | |
| 9,493,590 B2 | 11/2016 | Berthold et al. | |
| 2008/0139750 A1 | 6/2008 | Berthold et al. | |
| 2010/0160579 A1* | 6/2010 | Yang | C08F 210/16 |
| | | | 526/95 |

(Continued)

FOREIGN PATENT DOCUMENTS

| | | |
|---|---|---|
| EP | 2 591 050 B1 | 12/2014 |
| EP | 2 528 970 B1 | 7/2015 |

(Continued)

OTHER PUBLICATIONS

Wang, XiaoChuan (Alan); The Effects of Comonomer Distribution Profile on the Blown Film Properties of Single Site Catalyzed Polyethylenes; ANTEC 2009; pp. 2345-2349.

*Primary Examiner* — Fred M Teskin
(74) *Attorney, Agent, or Firm* — Julie L. Heinrich

(57) ABSTRACT

This disclosure relates to a continuous solution three reactor polymerization process. Process solvent, ethylene, optional comonomers, optional hydrogen and a single site catalyst system are injected into a first and second reactor configured in parallel to one another. A third reactor receives effluent from the first reactor, the second reactor, or a combination of the first and second reactors. Fresh monomer is feed to the third reactor for further polymerization and to give a final polyethylene product.

23 Claims, 13 Drawing Sheets

(56) References Cited

U.S. PATENT DOCUMENTS

| | | |
|---|---|---|
| 2011/0318559 A1 | 12/2011 | Berthold et al. |
| 2013/0216736 A1 | 8/2013 | Sandkuehler et al. |
| 2013/0243990 A1 | 9/2013 | Berthold et al. |
| 2013/0345377 A1* | 12/2013 | Ker .................... C08F 210/16 526/147 |
| 2016/0108221 A1 | 4/2016 | Sibtain et al. |
| 2016/0280821 A1 | 9/2016 | Liu et al. |

FOREIGN PATENT DOCUMENTS

| | | |
|---|---|---|
| EP | 2 809 717 B1 | 7/2016 |
| WO | 2012/005974 A1 | 1/2012 |

* cited by examiner

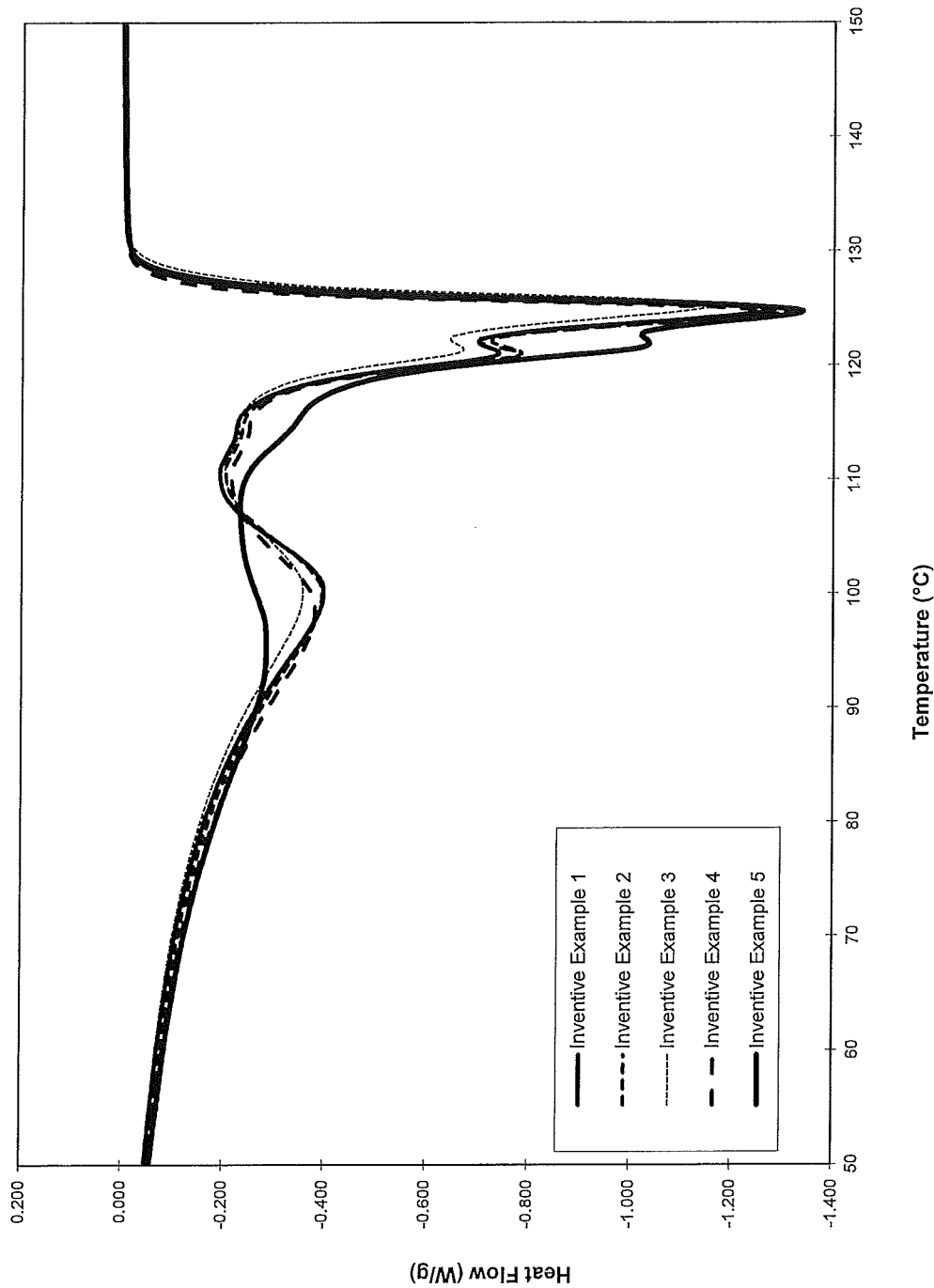

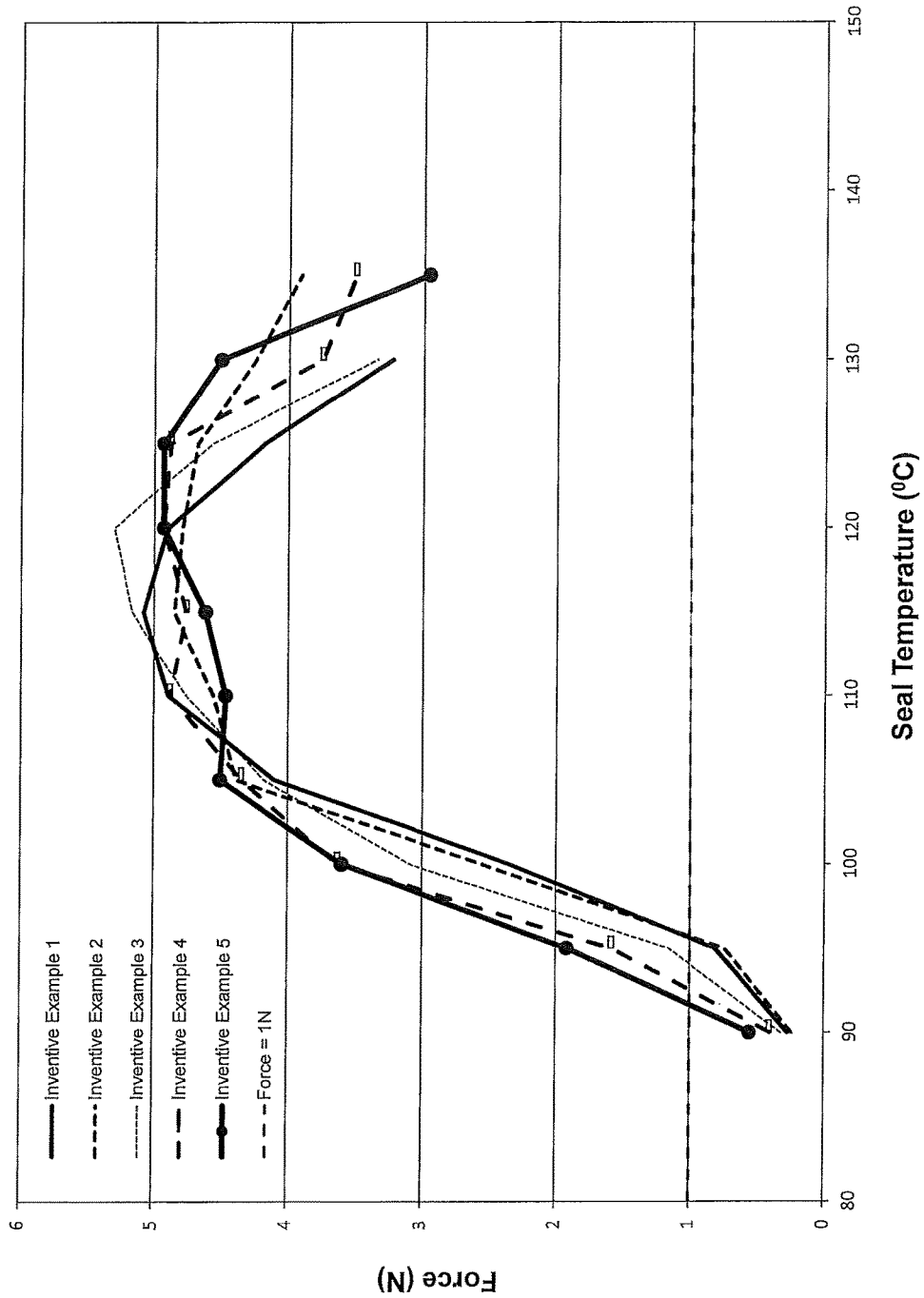

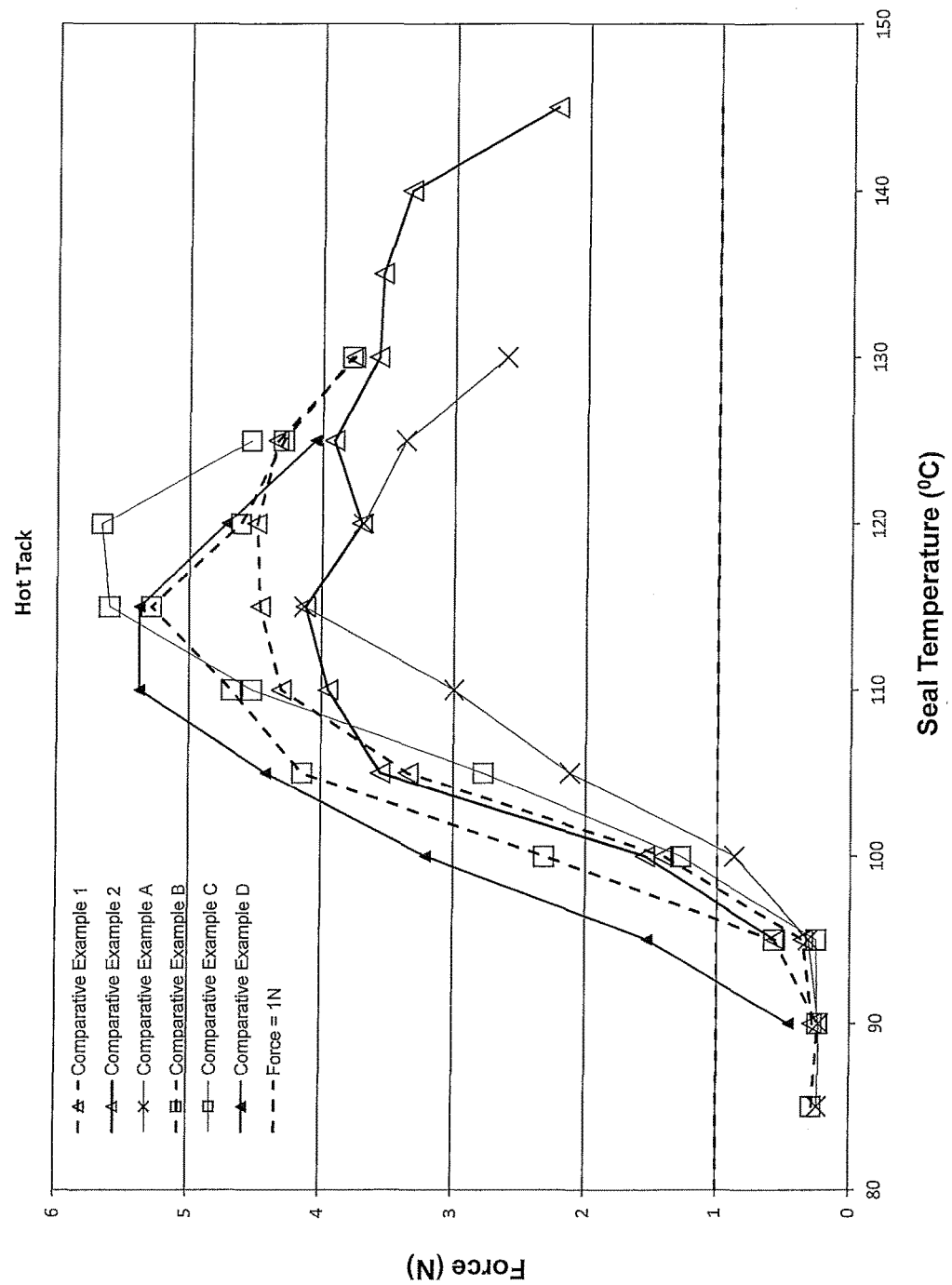

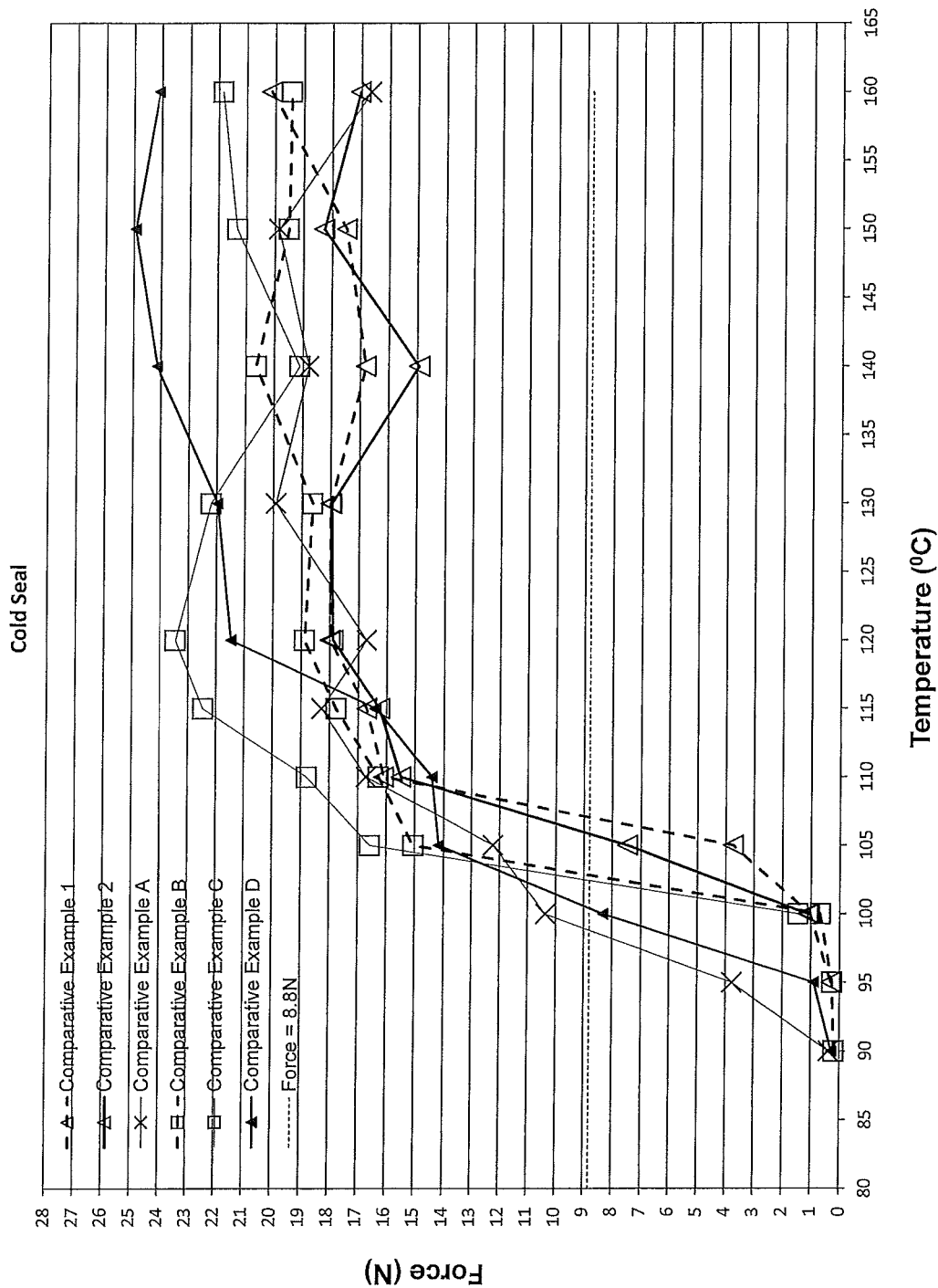

MULTI REACTOR SOLUTION POLYMERIZATION

This discloses a polymerization process utilizing at least three reactors, where two of the reactors are configured in parallel. Ethylene monomer is feed to each of the three reactors. Using this process, new multimodal polyethylene compositions are obtained while process efficiency improvements are realized.

Solution polymerization processes are, in some embodiments, carried out at temperatures above the melting point of the ethylene homopolymer or copolymer product being made. In a typical solution polymerization process, catalyst components, solvent, monomers and hydrogen are fed under pressure to one or more reactors.

For ethylene polymerization, or ethylene copolymerization, reactor temperatures can range from about 80° C. to about 300° C. while, in some embodiments, pressures range from about 3 MPag to about 45 MPag. The ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers. Post reactor, the polymerization reaction is quenched to prevent further polymerization, by adding a catalyst deactivator, and optionally passivated, by adding an acid scavenger. Once deactivated (and optionally passivated), the polymer solution is passed to a polymer recovery operation (a devolatilization system) where the ethylene homopolymer or copolymer is separated from process solvent, unreacted residual ethylene and unreacted optional α-olefin(s).

U.S. Pat. No. 5,236,998 describes the use of a three reactor solution polymerization process. Two reactors are configured in parallel and their product streams are combined on route to a third reactor. The polymerization process is catalyzed by a Ziegler-Natta catalyst and allows for the formation of polyethylene products comprising three components, one from each reactor. However, the disclosure fails to disclose or contemplate advantages which may be achieved by feeding fresh monomer (and optionally fresh catalyst) to the third reactor. This is the subject matter of the present disclosure.

The present disclosure provides a continuous solution polymerization process which improves energy efficiency by reducing the amount of energy consumed.

An embodiment of the disclosure is a continuous solution polymerization process comprising:

injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;

passing the first exit stream and the second exit stream into a third reactor and injecting into the third reactor, ethylene, and optionally each of:
  a process solvent,
  one or more α-olefins,
  hydrogen and
  a second catalyst system,
to produce a third exit stream containing a final polyethylene product;

passing the third exit stream to a devolatilization system to recover the final polyethylene product; wherein the first reactor is operated at lower temperature than the second reactor;

the first catalyst system is a single site catalyst system; and if injected into the third reactor, the second catalyst system is a single site catalyst system or a Ziegler-Natta catalyst system.

An embodiment of the disclosure is a continuous solution polymerization process comprising:

injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;

passing the first exit stream into a third reactor and injecting into the third reactor, ethylene, and optionally each of:
  a process solvent,
  one or more α-olefins,
  hydrogen and
  a second catalyst system,
to produce a third exit stream;
  combining the second exit stream with the third exit stream to produce a final product stream containing a final polyethylene product;
  passing the final product stream to a devolatilization system to recover the final polyethylene product; wherein the first reactor is operated at lower temperature than the second reactor;

the first catalyst system is a single site catalyst system; and if injected into the third reactor, the second catalyst system is a single site catalyst system or a Ziegler-Natta catalyst system.

An embodiment of the disclosure is a continuous solution polymerization process comprising:

injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;

passing the second exit stream into a third reactor and injecting into the third reactor, ethylene, and optionally each of:
  a process solvent,
  one or more α-olefins,
  hydrogen and
  a second catalyst system,
to produce a third exit stream;
  combining the first exit stream with the third exit stream to produce a final product stream containing a final polyethylene product;
  passing the final product stream to a devolatilization system to recover the final polyethylene product; wherein the first reactor is operated at lower temperature than the second reactor;

the first catalyst system is a single site catalyst system; and if injected into the third reactor, the second catalyst system is a single site catalyst system or a Ziegler-Natta catalyst system.

In an embodiment of the disclosure, a first catalyst system is a single site catalyst system comprising:

a) a phosphinimine complex defined by the formula

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;

b) an alkylaluminoxane co-catalyst;
c) an ionic activator, and;
d) optionally, a hindered phenol.

In an embodiment of the disclosure an alkylaluminoxane co-catalyst is methylaluminoxane (MAO).

In an embodiment of the disclosure an ionic activator is trityl tetrakis (pentafluoro-phenyl) borate.

In an embodiment of the disclosure at least 10 weight percent of the total ethylene injected into reactor 1, reactor 2 and reactor 3, is injected into reactor 3.

In an embodiment of the disclosure at least 20 weight percent of the total ethylene injected into reactor 1, reactor 2 and reactor 3, is injected into reactor 3.

In an embodiment of the disclosure at least 30 weight percent of the total ethylene injected into reactor 1, reactor 2 and reactor 3, is injected into reactor 3.

In an embodiment of the disclosure a first, second and third reactor operate at a temperature from about 80° C. to about 300° C. and a pressure from about 3 MPag to about 45 MPag.

In an embodiment of the disclosure a first reactor operates at a temperature at least 25° C. lower than the temperature at which a second reactor operates.

In an embodiment of the disclosure a first reactor operates at a temperature at least 45° C. lower than the temperature at which a second reactor operates.

In an embodiment of the disclosure a first reactor operates at a temperature of from about 10° C. to about 100° C. lower than the temperature at which a second reactor operates.

In an embodiment of the disclosure one or more α-olefins is fed exclusively to the first reactor.

In an embodiment of the disclosure a second catalyst is fed to the third reactor.

In an embodiment of the disclosure a first reactor and a second reactor are continuously stirred tank reactors.

In an embodiment of the disclosure a first reactor and a second reactor are loop reactors.

In an embodiment of the disclosure a first reactor and a second reactor are independently a continuously stirred tank reactor or a loop reactor.

In an embodiment of the disclosure a third reactor is a tubular reactor.

In an embodiment of the disclosure a second catalyst system is a single site catalyst system comprising:

a) a phosphinimine complex defined by the formula

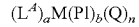

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;

b) an alkylaluminoxane co-catalyst;
c) an ionic activator, and;
d) optionally, a hindered phenol.

In an embodiment of the disclosure a second catalyst system is a Ziegler-Natta catalyst system.

In an embodiment of the disclosure a process solvent is one or more $C_5$ to $C_{12}$ alkanes.

In an embodiment of the disclosure one or more α-olefins are selected from $C_3$ to $C_{10}$ α-olefins.

In an embodiment of the disclosure one or more α-olefins are selected from 1-hexene or 1-octene or a mixture of 1-hexene and 1-octene.

In an embodiment of the disclosure a first exit stream and a second exit stream are combined upstream of a third reactor.

BRIEF DESCRIPTION OF FIGURES

These figures are presented for the purpose of illustrating selected embodiments of this disclosure; it being understood, that the embodiments in this disclosure are not limited to the precise arrangement of, or the number of, vessels shown.

FIG. 6A shows the differential scanning calorimetry analysis (DSC) and profile of polyethylene product compositions made according to the present disclosure.

FIG. 7A shows the hot tack profiles for the films made using the polyethylene product compositions made according to the present invention.

FIG. 7B shows the hot tack profiles for the films made using the comparative polyethylene product compositions.

FIG. 8B shows the cold seal profiles for the films made using the comparative polyethylene product compositions.

Figure 1:
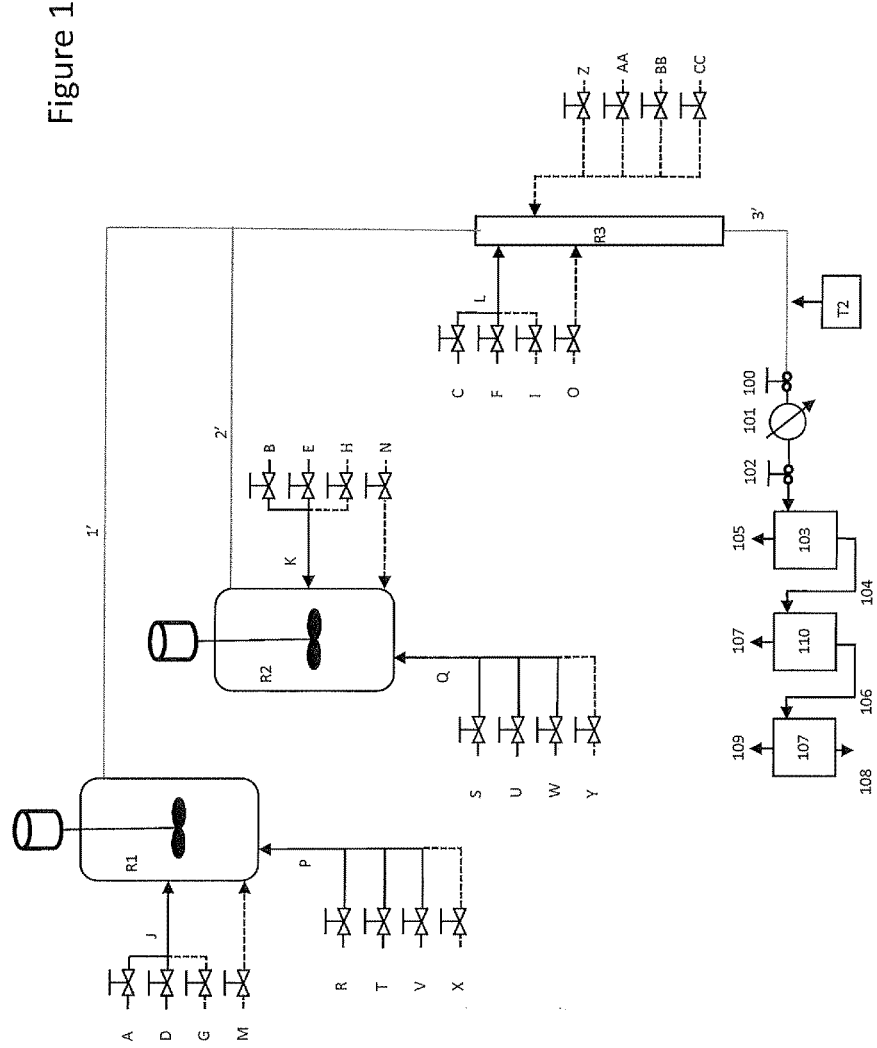
FIG. 1 illustrates a continuous solution polymerization process where a first and second polymerization reactor are configured in parallel to one another and are upstream of a third reactor which receives a combined effluent from both the first and the second reactors.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin".

As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains one type of monomer. An "ethylene homopolymer" is made using only ethylene as a polymerizable monomer. The term "copolymer" refers to a polymer that contains two or more types of monomer. An "ethylene copolymer" is made using ethylene and one or more other types of polymerizable monomer. Common polyethylenes include high density polyethylene (HDPE), medium density polyethylene (MDPE), linear low density polyethylene (LLDPE), very low density polyethylene (VLDPE), ultralow density polyethylene (ULDPE), plastomer and elastomers. The term polyethylene also includes polyethylene terpolymers which may include two or more comonomers in addition to ethylene. The term polyethylene also includes combinations of, or blends of, the polyethylenes described above.

The term "heterogeneous polyethylene" refers to a subset of polymers in the ethylene polymer group that are produced using a heterogeneous catalyst system; non-limiting examples of which include Ziegler-Natta or chromium catalysts, both of which are well known in the art.

The term "homogeneous polyethylene" refers to a subset of polymers in the ethylene polymer group that are produced using single-site catalysts; non-limiting examples of which include metallocene catalysts, phopshinimine catalysts, and constrained geometry catalysts all of which are well known in the art.

In some embodiments, homogeneous polyethylenes have narrow molecular weight distributions, for example gel permeation chromatography (GPC) $M_w/M_n$ values of less than 2.8, although exceptions may arise; $M_w$ and $M_n$ refer to weight and number average molecular weights, respectively. In contrast, the $M_w/M_n$ of heterogeneous ethylene polymers are, In some embodiments, greater than the $M_w/M_n$ of homogeneous ethylene polymers. In some embodiments, homogeneous ethylene polymers also have a narrow comonomer distribution, i.e. each macromolecule within the molecular weight distribution has a similar comonomer content. In some embodiments, the composition distribution breadth index "CDBI" is used to quantify how the comonomer is distributed within an ethylene polymer, as well as to differentiate ethylene polymers produced with different catalysts or processes. The "$CDBI_{50}$" is defined as the percent of ethylene polymer whose composition is within 50 weight percent (wt %) of the median comonomer composition; this definition is consistent with that described in WO 93/03093 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. In some embodiments the $CDBI_{50}$ of homogeneous ethylene polymers are greater than about 70%. In contrast, the $CDBI_{50}$ of α-olefin containing heterogeneous ethylene polymers are generally lower than the $CDBI_{50}$ of homogeneous ethylene polymers.

It is well known to those skilled in the art, that homogeneous ethylene polymers are frequently further subdivided into "linear homogeneous ethylene polymers" and "substantially linear homogeneous ethylene polymers". These two subgroups differ in the amount of long chain branching: more specifically, linear homogeneous ethylene polymers have less than about 0.01 long chain branches per 1000 carbon atoms; while substantially linear ethylene polymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneous polyethylene" refers to both linear homogeneous ethylene polymers and substantially linear homogeneous ethylene polymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms chosen from boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms chosen from boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{30}$ alkyl groups, $C_2$ to $C_{30}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" refers to a first reactor in a continuous solution polymerization process; it being understood that R1 is distinctly different from the symbol $R^1$; the latter is used in chemical formula, e.g. representing a hydrocarbyl group. Similarly, the term "R2" refers to a second reactor, and; the term "R3" refers to a third reactor.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

Catalyst systems that are efficient in polymerizing olefins are well known in the art. In the embodiments disclosed herein, at least one catalyst system is employed in a continuous solution polymerization process.

In embodiment of the disclosure a first catalyst system is a single site catalyst system and comprises at least one single-site catalyst that produces a homogeneous ethylene polymer.

The catalyst components which make up the single site catalyst system are not particularly limited, i.e. a wide variety of catalyst components can be used.

In one non-limiting embodiment of the disclosure, a single site catalyst system comprises the following three or four components: a phosphinimine metal complex; an alkylaluminoxane co-catalyst; an ionic activator and optionally a hindered phenol.

In an embodiment of the disclosure, and as shown in Table 1, the term "component (a)" refers to a phosphinimine metal complex, the term "component (b)" refers to an alkylaluminoxane co-catalyst, the term "component (c)" refers to an ionic activator, and; the term "component (d)" refers to an optional hindered phenol.

In an embodiment of the disclosure, non-limiting examples of component (a) are represented by formula:

wherein ($L^A$) represents is cyclopentadienyl type ligand; M represents a metal atom; Pl represents a phosphinimine ligand; Q represents an activatable ligand; a is 0 or 1; b is 1 or 2; (a+b)=2; n is 1 or 2, and; the sum of (a+b+n) equals the valance of the metal M.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be chosen from a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as —$CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —$Si(R')_3$ wherein each R' is independently chosen from hydrogen, a $C_{1-8}$ alkyl or alkoxy radical, $C_{6-10}$ aryl or aryloxy radicals; and a germanyl radical of the formula —$Ge(R')_3$ wherein R' is as defined directly above.

Non-limiting examples of metal M in the phosphinimine metal complex include Group 4 metals, titanium, zirconium and hafnium.

The phosphinimine ligand, Pl, is defined by formula:

$$(R^P)_3P=N—$$

wherein the RP groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently chosen from a hydrogen atom; a halogen atom, a $C_{1-10}$ hydrocarbyl radical; a $C_{1-10}$ alkoxy radical; and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy; a $C_{6-10}$ aryl or aryloxy; an amido or a phosphido radical, but where Q is not a cyclopentadienyl. Two Q ligands may also be joined to one another and form for example, a substituted or unsubstituted diene ligand (i.e. 1,3-butadiene); or a delocalized heteroatom containing group such as an acetate or acetamidinate group.

In a convenient embodiment of the disclosure, each X is independently chosen from a halide atom, a $C_{1-4}$ alkyl radical and a benzyl radical.

Particularly suitable activatable ligands are monoanionic such as a halide (e.g. chloride) or a hydrocarbyl (e.g. methyl, benzyl).

In an embodiment of the disclosure, the single site catalyst component (b), is an alkylaluminoxane co-catalyst. Although the exact structure of this co-catalyst is uncertain, subject matter experts generally agree that it is an oligomeric species that contain repeating units of the general formula:

$$(R)_2AlO—(Al(R)—O)_n—Al(R)_2$$

where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the catalyst activator is modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

In an embodiment of the disclosure, component (c) of the single site catalyst system is an ionic activator. In some embodiments, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below;

$$[R^5]^+[B(R^7)_4]^-$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —$Si(R^9)_3$, where each $R^9$ is independently selected from hydrogen atoms and $C_{1-4}$ alkyl radicals, and $$[(R^8)_tZH]^+[B(R^7)_4]^-$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above.

In both formula a non-limiting example of $R^7$ is a pentafluorophenyl radical. In some embodiments, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl)

ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst system is a hindered phenol, component (d). Non-limiting example of hindered phenols include butylated phenolic antioxidants, butylated hydroxytoluene, 2,6-di-tertiarybutyl-4-ethyl phenol, 4,4'-methylenebis (2,6-di-tertiarybutylphenol), 1,3, 5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst system the quantity and mole ratios of the three or four components, (a) through (d) are optimized as described further below.

In an embodiment of the disclosure a second catalyst system is a single site catalyst system as described above or a Ziegler-Natta catalyst as described below.

Ziegler-Natta catalyst systems are well known to those skilled in the art.

In this disclosure, a second catalyst system may be an in-line Ziegler-Natta catalyst system or a batch Ziegler-Natta catalyst system. The term "in-line Ziegler-Natta catalyst system" refers to the continuous synthesis of a small quantity of an active Ziegler-Natta catalyst system and immediately injecting this catalyst into at least one continuously operating reactor, wherein the catalyst polymerizes ethylene and one or more optional α-olefins to form an ethylene polymer. The terms "batch Ziegler-Natta catalyst system" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst system, or batch Ziegler-Natta procatalyst, is transferred to a catalyst storage tank. The term "procatalyst" refers to an inactive catalyst system (inactive with respect to ethylene polymerization); the procatalyst is converted into an active catalyst by adding an alkyl aluminum co-catalyst. As needed, the procatalyst is pumped from the storage tank to at least one continuously operating reactor, wherein an active catalyst polymerizes ethylene and one or more optional α-olefins to form a polyethylene. The procatalyst may be converted into an active catalyst in the reactor or external to the reactor, or on route to the reactor.

A wide variety of compounds can be used to synthesize an active Ziegler-Natta catalyst system. The following describes various compounds that may be combined to produce an active Ziegler-Natta catalyst system. Those skilled in the art will understand that the embodiments in this disclosure are not limited to the specific compounds disclosed.

An active Ziegler-Natta catalyst system may be formed from: a magnesium compound, a chloride compound, a metal compound, an alkyl aluminum co-catalyst and an aluminum alkyl. As will be appreciated by those skilled in the art, Ziegler-Natta catalyst systems may contain additional components; a non-limiting example of an additional component is an electron donor, e.g. amines or ethers.

A non-limiting example of an active in-line (or batch) Ziegler-Natta catalyst system can be prepared as follows. In the first step, a solution of a magnesium compound (component (e)) is reacted with a solution of a chloride compound (component (f)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (g)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (h)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (i)) is added to the metal compound supported on the magnesium chloride. A wide variety of alkyl aluminum co-catalysts are suitable, as expressed by formula:

$$Al(R^4)_p(OR^9)_q(X)_r$$

wherein the $R^4$ groups may be the same or different, hydrocarbyl groups having from 1 to 10 carbon atoms; the $OR^9$ groups may be the same or different, alkoxy or aryloxy groups wherein $R^9$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line (or batch) Ziegler-Natta catalyst system, can be carried out in a variety of solvents; non-limiting examples of solvents include linear or branched $C_5$ to $C_{12}$ alkanes or mixtures thereof.

To produce an active Ziegler-Natta catalyst system the quantity and mole ratios of the components, (e) through (i) are optimized as described further below.

Figure 2:
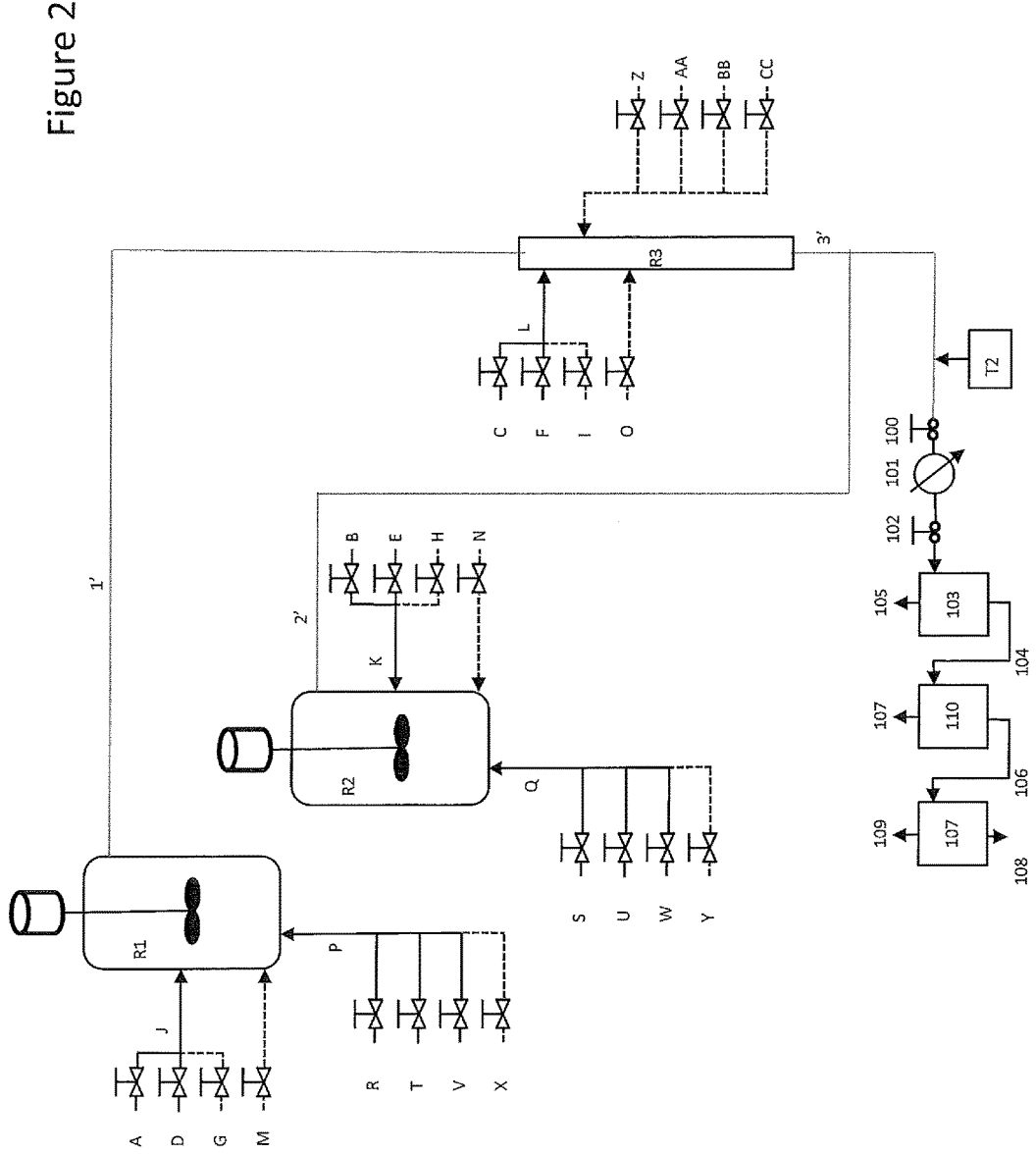
FIG. 2 illustrates a continuous solution polymerization process where a first and second polymerization reactor are configured in parallel to one another and a third reactor receives effluent from the first reactor.
Figure 3:
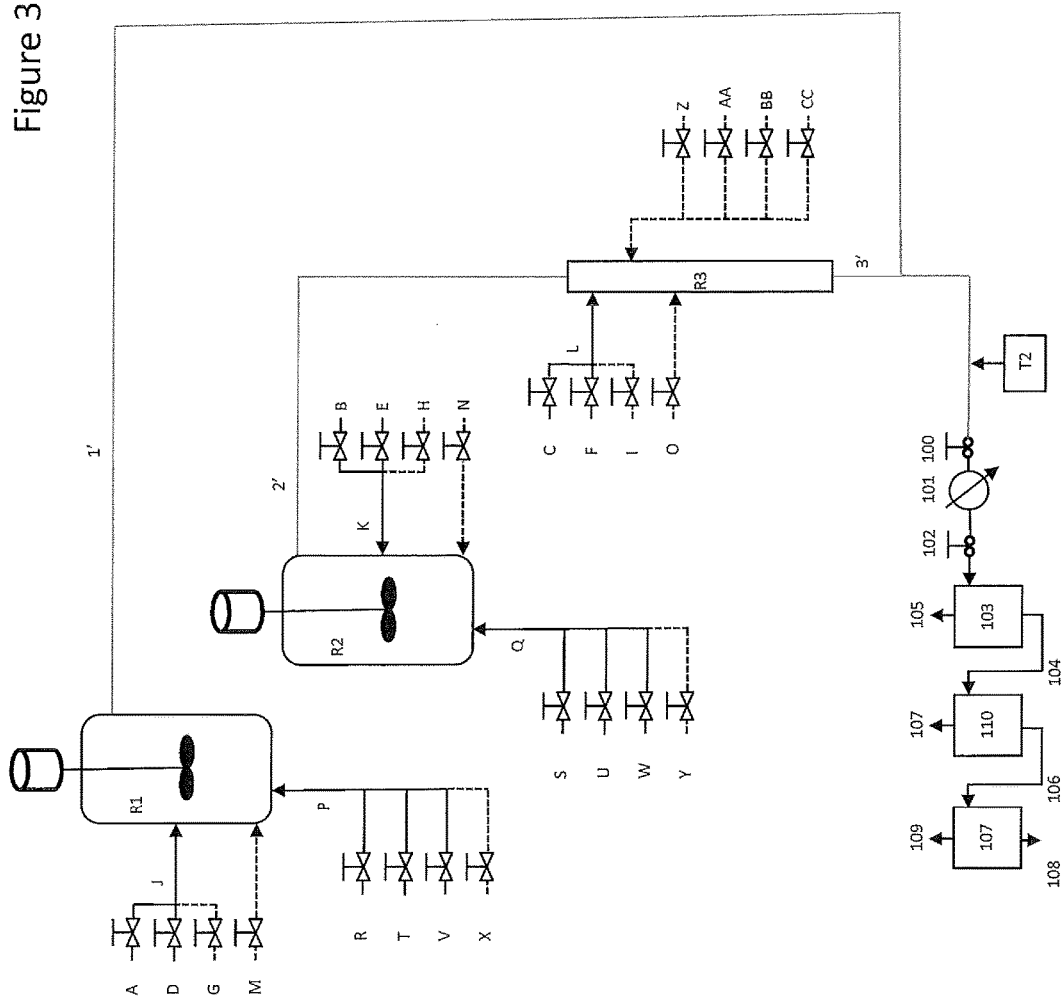
FIG. 3 illustrates a continuous solution polymerization process where a first and second polymerization reactor are configured in parallel and a third reactor receives effluent from the second reactor.

Embodiments of the solution polymerization process of the present disclosure are shown in FIGS. 1-3.

Referring to FIGS. 1, 2 and 3 process solvent is injected into two parallel reactors, reactor 1 "R1" and reactor 2 "R2" via streams A and B and into the third reactor, reactor 3 "R3" via stream C. Ethylene is injected into reactors 1, 2 and 3 via streams D, E and F respectively. Optional α-olefin is injected into reactors 1, 2 and 3 via streams G, H, and I respectively. As shown in FIGS. 1-3, the process solvent, ethylene and optional α-olefin feed streams are combined to form reactor feed streams J, K and L that feed reactors 1, 2 and 3, respectively. Optional hydrogen is injected into reactors 1, 2 and 3 via streams M, N and O respectively.

A single site catalyst system (the first catalyst system) is injected into reactors 1 and 2 via streams P and Q respectively. When an α-olefin is injected into reactors 1 and/or 2, a first and/or second ethylene copolymer are produced in reactors 1 and 2, respectively. If an α-olefin is not added, then ethylene homopolymers are formed.

In an embodiment of the disclosure, an α-olefin is injected into reactor 1 but not into reactor 2, so that a first polyethylene made in reactor 1 is an ethylene copolymer and a second polyethylene made in reactor 2 is an ethylene homopolymer.

Catalyst streams R and S contain an ionic activator dissolved in a catalyst component solvent. Catalyst streams T and U contain an organometallic complex, such as a phosphinimine complex, dissolved in a catalyst component solvent.

Catalyst streams V and W contain an alkylaluminoxane co-catalyst dissolved in a catalyst component solvent. Optional catalyst streams X and Y contain a hindered phenol dissolved in a catalyst component solvent. Catalyst component solvents for the various catalyst components may be the same or different.

Optionally a second catalyst system is injected into reactor 3. The second catalyst system may be a single site catalyst or a Ziegler-Natta catalyst.

In an embodiment a single site catalyst is injected into reactor 3. Hence in an embodiment of the disclosure, catalyst stream Z contains an ionic activator dissolved in a catalyst component solvent; catalyst stream AA contains an organometallic complex, such as a phosphinimine complex, dissolved in a catalyst component solvent; catalyst stream BB contains an alkylaluminoxane co-catalyst dissolved in a catalyst component solvent; and optional catalyst stream CC contains a hindered phenol dissolved in a catalyst component solvent. Catalyst component solvents for the various catalyst components may be the same or different.

In an embodiment a Ziegler-Natta catalyst is injected into reactor 3. The Ziegler-Natta catalyst may be prepared in line as discussed above and fed to reactor 3 (not shown in the Figures), or the Ziegler-Natta catalyst may be prepared in batch mode, stored in a holding tank and activated before entering reactor 3, or on route to reactor 3 as discussed above (not shown in the Figures).

In an embodiment of the continuous solution polymerization process shown in FIG. 1, reactor 1 produces exit stream 1' and reactor 2 produces exit stream 2'.

Exit streams 1' and 2' are then combined on route to Reactor 3. A third ethylene copolymer is produced in reactor 3. Reactor 3 produces an exit stream 3' containing a final polyethylene product.

In an embodiment of the continuous solution polymerization process shown in FIG. 1, reactor 3 produces exit stream 3' containing a final polyethylene product. Downstream of reactor 3, a catalyst deactivator is added via catalyst deactivator tank T2 forming deactivated stream which is then fed via a pressure let down device, 100 to a devolatilization system. The devolatilization system comprises a vapour/liquid ("V/L") separator 103 (or alternatively a liquid/liquid separator, not shown), downstream of a heat exchanger, 101 and a second pressure let-down device 102. Two streams are formed in V/L separator 103 (or alternatively a liquid/liquid separator); bottom stream 104 containing an ethylene polymer rich solution and gaseous overhead stream 105. Optionally, bottom stream 104 enters a second V/L separator 110 (or alternatively a liquid/liquid separator, not shown) and two streams are formed; bottom stream 106 and gaseous overhead stream 107. Optionally, bottom stream 106 enters a third V/L separator 107 (or alternatively a liquid/liquid separator, not shown) and two streams are formed; product stream 108 and gaseous overhead stream 109.

Product stream 108 proceeds to polymer recovery. Gaseous overhead streams 105, 107 and 109 are sent to a distillation column where solvent, ethylene and optional α-olefin are separated and recycled to the solution polymerization process.

Another embodiment of the continuous solution polymerization process is shown in FIG. 2. All feed and exit streams are labelled analogously to that discussed above with respect to FIG. 1. In an embodiment of the continuous solution polymerization process shown in FIG. 2, reactor 1 produces exit stream 1' which flows into reactor 3. Reactor 3 then produces an exit stream 3'. Reactor 2 produces an exit stream 2' which is combined with the exit stream 3' to produce a final product stream containing a final polyethylene product. The final product stream is deactivated by adding catalyst deactivator from catalyst deactivator tank T2 forming a deactivated stream. The deactivated stream is then fed via a pressure let down device, 100 to a devolatilization system. The devolatilization system comprises a vapour/liquid ("V/L") separator 103 (or alternatively a liquid/liquid separator, not shown), a downstream heat exchanger, 101 and a second pressure let-down device 102. Two streams are formed in V/L separator 103 (or alternatively a liquid/liquid separator); bottom stream 104 containing an ethylene polymer rich solution and gaseous overhead stream 105. Optionally, bottom stream 104 enters a second V/L separator 110 (or alternatively a liquid/liquid separator, not shown) and two streams are formed; bottom stream 106 and gaseous overhead stream 107. Optionally, bottom stream 106 enters a third V/L separator 107 (or alternatively a liquid/liquid separator, not shown) and two streams are formed; product stream 108 and gaseous overhead stream 109. Product stream 108 proceeds to polymer recovery. Gaseous overhead streams 105, 107 and 109 are sent to a distillation column where solvent, ethylene and optional α-olefin are separated and recycled to the solution polymerization process.

Another embodiment of the continuous solution polymerization process is shown in FIG. 3. All feed and exit streams are labelled analogously to that discussed above with respect to FIG. 1. In an embodiment of the continuous solution polymerization process shown in FIG. 3, reactor 2 produces exit stream 2' which flows into reactor 3. Reactor 3 then produces an exit stream 3'. Reactor 1 produces an exit stream 1' which is combined with the exit stream 3' to produce a final product stream containing a final polyethylene product. The final product stream is deactivated by adding catalyst deactivator from catalyst deactivator tank T2 forming a deactivated stream. The deactivated stream is then fed via a pressure let down device, 100 to a devolatilization system. The devolatilization system comprises a vapour/liquid ("V/L") separator 103 (or alternatively a liquid/liquid separator, not shown), a downstream heat exchanger, 101 and a second pressure let-down device 102. Two streams are formed in V/L separator 103 (or alternatively a liquid/liquid separator); bottom stream 104 containing an ethylene polymer rich solution and gaseous overhead stream 105. Optionally, bottom stream 104 enters a second V/L separator 110 (or alternatively a liquid/liquid separator, not shown) and two streams are formed; bottom stream 106 and gaseous overhead stream 107. Optionally, bottom stream 106 enters a third V/L separator 107 (or alternatively a liquid/liquid separator, not shown) and two streams are formed; product stream 108 and gaseous overhead stream 109. Product stream 108 proceeds to polymer recovery. Gaseous overhead streams 105, 107 and 109 are sent to a distillation column where solvent, ethylene and optional α-olefin are separated and recycled to the solution polymerization process.

With reference to FIGS. 1-3, catalyst deactivator tank T2 may contain neat (100%) catalyst deactivator, a solution of catalyst deactivator in a solvent, or a slurry of catalyst deactivator in a solvent. Non-limiting examples of suitable solvents include linear or branched $C_5$ to $C_{12}$ alkanes. In this disclosure, how the catalyst deactivator is added is not particularly important. Once added, the catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.).

In an embodiment of the disclosure, a passivating agent may be added to the final product stream downstream of the heat exchange 101, but upstream of the pressure let-down device 102 (not shown in FIGS. 1-3). Without wishing to be bound by any single theory, passification helps to reduce chloride levels in the final polyethylene product. The addition of passivators may be particularly useful when a Ziegler-Natta catalyst system is fed to reactor 3. The passivator may be added in a solvent, or as a slurry of passivator in a solvent. Non-limiting examples of suitable solvents include linear or branched $C_5$ to $C_{12}$ alkanes. In this disclosure, how a passivator is added is not particularly important. Suitable passivators are well known in the art, non-limiting examples include alkali or alkaline earth metal salts of carboxylic acids or hydrotalcites. The quantity of passivator added can vary over a wide range.

In an embodiment of the continuous solution polymerization process the first and second reactors are continuously stirred tanks reactors (CSTRs).

In an embodiment of the continuous solution polymerization process the third reactor is a tubular reactor.

In an embodiment of the continuous solution polymerization process described herein ethylene is added to each of reactors 1, 2 and 3.

In an embodiment of the continuous solution polymerization process described herein a single site catalyst system is added to each of the first and second reactors, but not to the third reactor.

In an embodiment of the continuous solution polymerization process described herein a single site catalyst system is added to each of the first, second and third reactors.

In an embodiment of the continuous solution polymerization process described herein a single site catalyst system comprises a phosphinimine complex.

Referring to the embodiments shown in FIGS. 1, 2 and 3; an active single site catalyst system is produced by optimizing the proportion of each of the four single site catalyst components, (a) through (d) as defined above. The term "active" means the single site catalyst system is very efficient in converting olefins to polyolefins; in practice the optimization objective is to maximize the following ratio: (pounds of ethylene interpolymer product produced)/ (pounds of catalyst consumed).

The quantity of the phosphinimine complex, component (a), added to reactors 1 and 2 is expressed as the parts per million (ppm) of component (a) in the total mass of the solutions in reactors 1 and 2; which may be referred to hereafter as "R1($a$) (ppm)" or "R2($a$) (ppm)". The upper limit on R1($a$) (ppm) or R2($a$) (ppm) may be about 5, in some cases about 3 and is other cases about 2. The lower limit in R1($a$) (ppm) and R2($a$) (ppm) may be about 0.02, in some cases about 0.05 and in other cases about 0.1.

The proportion of catalyst component (c), the ionic activator, added to R1 and R2 is optimized by controlling the (ionic activator)/(phosphinimine complex) molar ratio in R1 and R2 solution; hereafter "R1($c$)/($a$)" and "R2($c$)/($a$)". The upper limit on R1 and R2 ($c$)/($a$) may be about 10, in some cases about 5 and in other cases about 2. The lower limit on R1($c$)/($a$) and R2 ($c$)/($a$) may be about 0.1, in some cases about 0.5 and in other cases about 1.0.

The proportion of catalyst component (b), the alkylaluminoxane is optimized by controlling the (Al from alkylaluminoxane)/(phosphinimine complex) molar ratio in R1 and R2 solution; hereafter "R1($b$)/($a$)" and "R2($b$)/($a$)". In some embodiments the alkylaluminoxane co-catalyst is added in a molar excess relative to the bulky ligand-metal complex. The upper limit on R1($b$)/($a$) and R2($b$)/($a$) may be about 1000, in some cases about 500 and is other cases about 200. The lower limit on R1($b$)/($a$) and R2($b$)/($a$) may be about 1, in some cases about 10 and in other cases about 30.

The addition of catalyst component (d), the hindered phenol, to R1 and R2 is optional in the embodiments shown in FIGS. 1-3. If added, the proportion of component (d) is optimized by controlling the (hindered phenol)/(Al from alkylaluminoxane) molar ratio in R1 and R2; hereafter "R1($d$)/(b)" and "R2($d$)/(b)".

The upper limit on R1($d$)/(b) and R2 ($d$)/(b) may be about 10, in some cases about 5 and in other cases about 2. The lower limit on R1($d$)/(b) and R2 ($d$)/(b) may be 0.0, in some cases about 0.1 and in other cases about 0.2.

If a single site catalyst is feed to reactor 3, then the phosphinimine complex (a), the ionic activator (c), the alkylaluminoxane (b) and optional, hindered phenol (d), are optimized as already described for reactors 1 and 2. Namely, the following are controlled.

The quantity of phosphinimine complex, component (a) added to reactor 3 as expressed as the parts per million (ppm) of component (a) in the total mass of the solutions in reactor 3, which may be referred to hereafter as "R3(*a*) (ppm)"; the upper limit on R3(*a*) (ppm) may be about 5, in some cases about 3 and is other cases about 2. The lower limit in R3 (*a*) (ppm) and R2(*a*) (ppm) may be about 0.02, in some cases about 0.05 and in other cases about 0.1.

The proportion of catalyst component (c), the ionic activator, added to R3 is optimized by controlling the (ionic activator)/(phosphinimine complex) molar ratio in R3; hereafter "R3(*c*)/(a)". The upper limit on R3(*c*)/(a) may be about 10, in some cases about 5 and in other cases about 2. The lower limit on R3(*c*)/(a) may be about 0.1, in some cases about 0.5 and in other cases about 1.0.

The proportion of catalyst component (b), the alkylaluminoxane is optimized by controlling the (Al from alkylaluminoxane)/(phosphinimine complex) molar ratio in R3 solution; hereafter "R3(*b*)/(a)". In some embodiments the alkylaluminoxane co-catalyst is added in a molar excess relative to the bulky ligand-metal complex. The upper limit on R3(*b*)/(a) may be about 1000, in some cases about 500 and is other cases about 200. The lower limit on R3(*b*)/(a) may be about 1, in some cases about 10 and in other cases about 30.

The addition of catalyst component (d), the hindered phenol, to R3 is optional in the embodiments shown in FIGS. 1-3. If added, the proportion of component (d) is optimized by controlling the (hindered phenol)/(Al from alkylaluminoxane) molar ratio in R3; hereafter "R3(*d*)/(b)". The upper limit on R3(*d*)/(b) may be about 10, in some cases about 5 and in other cases about 2. The lower limit on R3(*d*)/(b) may be 0.0, in some cases about 0.1 and in other cases about 0.2.

Any combination of the single site catalyst component streams in FIGS. 1-3 may, or may not, be heated or cooled. The upper limit on catalyst component stream temperatures may be about 70° C.; in other cases about 60° C. and in still other cases about 50° C. The lower limit on catalyst component stream temperatures may be about 0° C.; in other cases about 20° C. and in still other cases about 40° C.

For more information on the optimization of a single site catalyst for use with a continuous polymerization process see U.S. Pat. Appl. No. 2016/0108221A1 which is incorporated herein by reference.

Referring to the embodiments shown in FIGS. 1, 2 and 3; a Ziegler-Natta catalyst system is produced by optimizing the proportion of each of the five Ziegler-Natta catalyst components, (e) through (i) as defined above.

An efficient in-line Ziegler-Natta catalyst system may be found by optimizing the following molar ratios: (aluminum alkyl)/(magnesium compound) or (g)/(e); (chloride compound)/(magnesium compound) or (f)/(e); (alkyl aluminum co-catalyst)/(metal compound) or (i)/(h), and; (aluminum alkyl)/(metal compound) or (g)/(h); as well as the time these compounds have to react and equilibrate. The upper limit on the (aluminum alkyl)/(magnesium compound) molar ratio may be about 70, in some cases about 50 and is other cases about 30. The lower limit on the (aluminum alkyl)/(magnesium compound) molar ratio may be about 3.0, in some cases about 5.0 and in other cases about 10. The upper limit on the (chloride compound)/(magnesium compound) molar ratio may be about 4, in some cases about 3.5 and is other cases about 3.0. The lower limit on the (chloride compound)/(magnesium compound) molar ratio may be about 1.0, in some cases about 1.5 and in other cases about 1.9. The upper limit on the (alkyl aluminum co-catalyst)/(metal compound) molar ratio may be about 10, in some cases about 7.5 and is other cases about 6.0. The lower limit on the (alkyl aluminum co-catalyst)/(metal compound) molar ratio may be 0, in some cases about 1.0 and in other cases about 2.0.

For more information on the optimization of an in-line Ziegler-Natta catalyst system and the use of a batch Ziegler-Natta catalyst system for use with a continuous polymerization process see U.S. Pat. Appl. No. 2016/0108221A1 which is incorporated herein by reference.

In the continuous solution processes embodiments shown in FIGS. 1, 2 and 3 a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, α-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst system etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

Referring to the first and second reactors in FIGS. 1, 2 and 3 any combination of the reactor 1 or 2 feed streams may be heated or cooled. The upper limit on reactor feed stream temperatures may be about 90° C.; in other cases about 80° C. and in still other cases about 70° C. The lower limit on reactor feed stream temperatures may be about −20° C.; in other cases about 0° C., in other cases about 10° C. and in still other cases about 20° C. Any combination of the streams feeding reactor 3 may be heated or cooled. In some cases, reactor 3 reactor feed streams are tempered, i.e. the reactor 3 feed streams are heated to at least above ambient temperature. The upper temperature limit on the reactor 3 feed streams in some cases are about 200° C., in other cases about 170° C. and in still other cases about 140° C.; the lower temperature limit on the tubular reactor feed streams in some cases are about 40° C., in other cases about 60° C., in other cases about 90° C. and in still other cases about 120° C.; with the proviso that the temperature of the reactor 3 feed streams are lower than the temperature of the process stream that enters reactor 3.

In the embodiments shown in FIGS. 1-3 the operating temperatures of the solution polymerization reactors, reactors 1, 2 and 3 can vary over a wide range. For example, the upper limit on reactor temperatures in some cases may be about 300° C., in other cases about 280° C. and in still other cases about 260° C.; and the lower limit in some cases may be about 80° C., in other cases about 100° C. and in still other cases about 125° C.

In an embodiment of the disclosure, the first reactor is operated at a lower temperature than the second reactor.

The maximum temperature difference between these two reactors, $T^2-T^1$, where "$T^2$" is the R2 operation temperature and "$T^1$" is the R1 operation temperature, in some cases is about 120° C., in other cases about 100° C. and in still other cases about 80° C.; the minimum $T^2-T^1$ temp in some cases is about 1° C., in other cases about 5° C. and in still other cases about 10° C.

In an embodiment of the disclosure, the first reactor operates at a temperature, $T^1$ which is at least 25° C. lower than the temperature at which the second reactor operates, $T^2$.

In an embodiment of the disclosure, the first reactor operates at a temperature, $T^1$ which is at least 35° C. lower than the temperature at which the second reactor operates, $T^2$.

In an embodiment of the disclosure, the first reactor operates at a temperature, $T^1$ which is at least 45° C. lower than the temperature at which the second reactor operates, $T^2$.

In an embodiment of the disclosure, the first reactor operates at a temperature, $T^1$ which is at least 55° C. lower than the temperature at which the second reactor operates, $T^2$.

In an embodiment of the disclosure, the first reactor operates at a temperature, $T^1$ of from 10 to 100° C. lower than the temperature at which the second reactor operates, $T^2$.

In an embodiment of the disclosure, the first reactor operates at a temperature $T^1$ of from about 125° C. to about 155° C. and the second reactor operates at a temperature $T^2$ of from about 185° C. to about 205° C.

In an embodiment of the present disclosure, the third reactor operates at a temperature $T^3$ which is higher than the temperature at which the first reactor operates, $T^1$.

In an embodiment of the present disclosure, the third reactor operates at a temperature $T^3$ which is higher than the temperature at which the first and second reactors operate, $T^1$ and $T^2$ respectively.

In an embodiment of the present disclosure, the third reactor operates at a temperature $T^3$ which is higher than the weighted average of the operating temperatures at which the first and second reactors operate.

In an embodiment of the present disclosure, the third reactor operates at a temperature $T^3$ which is higher than the inlet temperature of the third reactor.

In an embodiment of the present disclosure, and with reference to FIG. 1, the third reactor operates at a temperature $T^3$ which is higher than the temperature of the combined reactor 1 and 2 exit streams 1' and 2' respectively.

In an embodiment of the present disclosure, and with reference to FIG. 1, the third reactor operates at a temperature $T^3$ which is higher than the weighted average temperature of the combined reactor 1 and 2 exit streams 1' and 2' respectively.

In embodiments of the disclosure, the third reactor may be operated at, at least about 100° C. higher than reactor 1; in other cases at least about 60° C. higher than reactor 1, in still other cases at least about 30° C. higher than reactor 1.

In embodiments of the disclosure, the third reactor may be operated at, at least about 60° C. higher than reactor 2; in other cases at least about 30° C. higher than reactor 2, in still other cases at least about 10° C. higher than reactor 2, in alternative cases 0° C. higher, i.e. the same temperature as reactor 2.

In an embodiment of the disclosure, the first reactor operates at a temperature of from about 115° C. to about 155° C. and the second reactor operates at a temperature of from about 190° C. to about 205° C.

The temperature within reactor 3 may increase along its length. The maximum temperature difference between the inlet and outlet of R3 in some cases is about 100° C., in other cases about 60° C. and in still other cases about 40° C. The minimum temperature difference between the inlet and outlet of R3 is in some cases may be 0° C., in other cases about 3° C. and in still other cases about 10° C. In some cases R3 is operated an adiabatic fashion and in other cases R3 is heated.

The pressure in the polymerization reactors should be high enough to maintain the polymerization solution as a single phase solution and to provide the upstream pressure to force the polymer solution from the reactors through a heat exchanger and on to polymer recovery operations. Referring to the embodiments shown in FIGS. 1, 2 and 3, the operating pressure of the solution polymerization reactors can vary over a wide range. For example, the upper limit on reactor pressure in some cases may be about 45 MPag, in other cases about 30 MPag and in still other cases about 20 MPag; and the lower limit in some cases may be about 3 MPag, in other some cases about 5 MPag and in still other cases about 7 MPag.

In an embodiment of the disclosure, one or more of the solution polymerization reactors can be operated at a pressure which is low enough for the one phase polymer solution to phase separate into a two phase liquid/liquid polymer solution.

The polyethylene product produced in the continuous solution polymerization process may be recovered using conventional devolatilization systems that are well known to persons skilled in the art, non-limiting examples include flash devolatilization systems and devolatilizing extruders.

Referring to the embodiments shown in FIGS. 1-3, prior to entering the first V/L separator, 103 the deactivated solution may have a maximum temperature in some cases of about 300° C., in other cases about 290° C. and in still other cases about 280° C.; the minimum temperature may be in some cases about 150° C., in other cases about 200° C. and in still other cases about 220° C. Immediately prior to entering the first V/L separator the deactived solution in some cases may have a maximum pressure of about 40 MPag, in other cases about 25 MPag and in still cases about 15 MPag; the minimum pressure in some cases may be about 1.5 MPag, in other cases about 5 MPag and in still other cases about 6 MPag.

The first V/L separator 103 may be operated over a relatively broad range of temperatures and pressures. For example, the maximum operating temperature of the first V/L separator in some cases may be about 300° C., in other cases about 285° C. and in still other cases about 270° C.; the minimum operating temperature in some cases may be about 100° C., in other cases about 140° C. and in still other cases 170° C. The maximum operating pressure of the first V/L separator in some cases may be about 20 MPag, in other cases about 10 MPag and in still other cases about 5 MPag; the minimum operating pressure in some cases may be about 1 MPag, in other cases about 2 MPag and in still other cases about 3 MPag.

The second V/L separator, 110 may be operated over a relatively broad range of temperatures and pressures. For example, the maximum operating temperature of the second V/L separator in some cases may be about 300° C., in other cases about 250° C. and in still other cases about 200° C.; the minimum operating temperature in some cases may be about 100° C., in other cases about 125° C. and in still other cases about 150° C. The maximum operating pressure of the second V/L separator in some cases may be about 1000 kPag, in other cases about 900 kPag and in still other cases about 800 kPag; the minimum operating pressure in some cases may be about 10 kPag, in other cases about 20 kPag and in still other cases about 30 kPag.

The third V/L separator, 107 may be operated over a relatively broad range of temperatures and pressures. For example, the maximum operating temperature of the third V/L separator in some cases may be about 300° C., in other cases about 250° C., and in still other cases about 200° C.; the minimum operating temperature in some cases may be about 100° C., in other cases about 125° C. and in still other cases about 150° C. The maximum operating pressure of the third V/L separator in some cases may be about 500 kPag, in other cases about 150 kPag and in still other cases about 100 kPag; the minimum operating pressure in some cases may be about 1 kPag, in other cases about 10 kPag and in still other cases 25 about kPag.

In an embodiment of the present disclosure, one or more V/L separator may be operated at vacuum pressure.

Embodiments of the continuous solution polymerization process shown in FIGS. 1-3 show three V/L separators. However, continuous solution polymerization embodiments may include configurations comprising at least one V/L separator.

In another embodiment of the disclosure, a two phase liquid/liquid polymer solution may be present or induced to be present downstream of the final polymerization reactor. Such a two phase liquid/liquid polymer solution may be separated into a polymer lean phase and a polymer rich phase downstream of the final polymerization reactor. A liquid/liquid ("L/L") phase separator may be operated over a relatively broad range of temperatures and pressures. One or more L/L phase separators may be used.

Any reactor shape or design may be used for reactors 1 and 2 in FIGS. 1-3; non-limiting examples include unstirred or stirred spherical, cylindrical or tank-like vessels, as well as tubular reactors or recirculating loop reactors. At commercial scale the maximum volume of reactors 1 and 2 in some cases may be about 20,000 gallons (about 75,710 L), in other cases about 10,000 gallons (about 37,850 L) and in still other cases about 5,000 gallons (about 18,930 L). At commercial scale the minimum volume of reactors 1 and 2 in some cases may be about 100 gallons (about 379 L), in other cases about 500 gallons (about 1,893 L) and in still other cases about 1,000 gallons (about 3,785 L). At pilot plant scales reactor volumes are typically much smaller, for example the volume of reactors 1 and 2 at pilot scale could be less than about 10 gallons (less than about 37 L).

In this disclosure the volume of reactor R2 may be expressed as a percent of the volume of reactor R1.

In embodiments of the disclosure the upper limit on the volume of R2 in some cases may be about 600% of R1, in other cases about 400% of R1 and in still other cases about 200% of R1. For clarity, if the volume of R1 is 5,000 gallons and R2 is 200% the volume of R1, then R2 has a volume of 10,000 gallons.

In embodiments of the disclosure the lower limit on the volume of R2 in some cases may be about 50% of R1, in other cases about 100% of R1 and in still other cases about 150% of R1. In the case of continuously stirred tank reactors the stirring rate can vary over a wide range; in some cases from about 10 rpm to about 2000 rpm, in other cases from about 100 to about 1500 rpm and in still other cases from about 200 to about 1300 rpm.

In an embodiment of this disclosure, reactor 3 is a tubular reactor, and the volume of R3, may be expressed as a percent of the volume of reactor R2. The upper limit on the volume of R3 in some cases may be about 500% of R2, in other cases about 300% of R2 and in still other cases about 100% of R2. The lower limit on the volume of R3 in some cases may be about 3% of R2, in other cases about 10% of R2 and in still other cases about 50% of R2.

The "average reactor residence time", a commonly used parameter in the chemical engineering art, is defined by the first moment of the reactor residence time distribution; the reactor residence time distribution is a probability distribution function that describes the amount of time that a fluid element spends inside the reactor. The average reactor residence time can vary widely depending on process flow rates and reactor mixing, design and capacity.

In embodiments of the disclosure, the upper limit on the average reactor residence time of the solution in reactors 1 and 2 is about 720 seconds, or about 600 seconds, or about 480 seconds, or about 360 seconds, or about 240 seconds, or about 180 seconds.

In embodiments of the disclosure, the lower limit on the average reactor residence time of the solution in reactors 1 and 2 is about 10 seconds, or about 20 seconds, or about 30 seconds, or about 40 seconds, or about 60 seconds.

In embodiments of the disclosure, the upper limit on the average reactor residence time of the solution in reactor 3 is about 600 seconds, or about 360 seconds, or about 180 seconds.

In embodiments of the disclosure, the lower limit on the average reactor residence time of the solution in reactor 3 is about 1 second, or about 5 seconds, or about 10 seconds.

Optionally, additional reactors (e.g. CSTRs, loops or tubes, etc.) could be added to the continuous solution polymerization process embodiments shown in FIGS. 1-3.

In operating the continuous solution polymerization process embodiments shown in FIGS. 1-3 the total amount of ethylene supplied to the process can be portioned or split between the three reactors R1, R2 and R3.

This operational variable is referred to as the Ethylene Split (ES), i.e. "$ES^{R1}$", "$ES^{R2}$" and "$ES^{R3}$" refer to the weight percent of ethylene injected in R1, R2 and R3, respectively; with the proviso that $ES^{R1}+ES^{R2}+ES^{R3}=100\%$. This is accomplished by adjusting the ethylene flow rates in the following streams: stream D (R1), stream E (R2) and stream F (R3).

In the present disclosure, at least 1 weight percent of the total ethylene injected into reactor 1, reactor 2 and reactor 3, is injected into reactor 3 (i.e. $ES^{R3}$ is at least 1%).

In an embodiment of the disclosure, at least 10 weight percent of the total ethylene injected into reactor 1, reactor 2 and reactor 3, is injected into reactor 3 (i.e. $ES^{R3}$ is at least 10%).

In an embodiment of the disclosure, at least 20 weight percent of the total ethylene injected into reactor 1, reactor 2 and reactor 3, is injected into reactor 3 (i.e. $ES^{R3}$ is at least 20%).

In an embodiment of the disclosure, at least 30 weight percent of the total ethylene injected into reactor 1, reactor 2 and reactor 3, is injected into reactor 3 (i.e. $ES^{R3}$ is at least 30%).

In an embodiment of the disclosure, at least 40 weight percent of the total ethylene injected into reactor 1, reactor 2 and reactor 3, is injected into reactor 3 (i.e. $ES^{R3}$ is at least 40%).

In an embodiment of the disclosure, at least 50 weight percent of the total ethylene injected into reactor 1, reactor 2 and reactor 3, is injected into reactor 3 (i.e. $ES^{R3}$ is at least 50%).

In embodiments of the disclosure, the upper limit on $ES^{R1}$ is about 80%, or about 75%, or about 70%, or about 65%; or about 60%, or about 55%; and the lower limit on $ES^{R1}$ is about 10%, or about 15%, or about 20%.

In embodiments of the disclosure, the upper limit on $ES^{R2}$ is about 60%, or about 55% or about 50%; or about 45%, or about 40%, or about 35%, or from about 30%; and the lower limit on $ES^{R2}$ is about 5%, or about 10%, or about 15%, or about 20%, or about 25%.

In embodiments of the disclosure, the upper limit on $ES^{R3}$ is about 50%, or about 40%, or about 35%, or about 30%, or about 25%, or about 20%; and the lower limit on $ES^{R3}$ is about 1%, or about 5%, or about 10%.

In operating the continuous solution polymerization process embodiments shown in FIGS. 1-3, the ethylene concentration in each reactor may also be controlled. For example, the ethylene concentration in reactor 1, hereafter "$EC^{R1}$", is defined as the weight of ethylene in reactor 1 divided by the total weight of everything added to reactor 1. An "$EC^{R2}$" and "$EC^{R3}$" may be similarly defined.

In embodiments of the disclosure, the ethylene concentration in the reactors ($EC^{R1}$ or $EC^{R2}$ or $EC^{R3}$) may vary from about 5 weight percent to about 25 weight percent, or from about 7 weight percent (wt %) to about 25 wt %, or from about 8 wt % to about 20 wt %, or from about 9 wt % to about 17 wt %.

In operating the continuous solution polymerization process embodiments shown in FIGS. 1-3 the total amount of ethylene converted in each reactor may be monitored. The term "$Q^{R1}$" refers to the percent of the ethylene added to R1 that is converted into a polyethylene polymer by the catalyst system. Similarly, "$Q^{R2}$" and "$Q^{R3}$" represent the percent of the ethylene added to R2 and R3 that was converted into a polyethylene polymer, in the respective reactors.

Ethylene conversions can vary significantly depending on a variety of process conditions, e.g. catalyst concentration, catalyst system, impurities and poisons.

In embodiments of the disclosure, the upper limit on both $Q^{R1}$ and $Q^{R2}$ may be about 99%, or about 95%, or about 90%; while the lower limit on both $Q^{R1}$ and $Q^{R2}$ may be from about 65%, or about 70%, or about 75%.

In embodiments of the disclosure, the upper limit on $Q^{R3}$ may be about 99%, or about 95%, or about 90%; while the lower limit on $Q^{R3}$ may be 1%, or about 5%, or about 10%.

The term "$Q^{TOTAL}$" represents the total or overall ethylene conversion across the entire continuous solution polymerization plant; i.e. $Q^T=100\times$[weight of ethylene in the polyethylene product]/([weight of ethylene in the polyethylene product]+[weight of unreacted ethylene]). The upper limit on $Q^T$ in some cases is about 99%, in other cases about 95% and in still other cases about 90%; the lower limit on $Q^T$ in some cases is about 75%, in other cases about 80% and in still other cases about 85%.

Optionally, α-olefin may be added to the continuous solution polymerization process. If added, α-olefin may be proportioned or split between R1, R2 and R3. This operational variable is referred to as the Comonomer Split (CS), i.e. "$CS^{R1}$" "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$. This is accomplished by adjusting α-olefin flow rates in the following streams: stream G (R1), stream H (R2) and stream I (R3).

The upper limit on $CS^{R1}$ in some cases is 100% (i.e. 100% of the α-olefin is injected into R1), in other cases about 95% and in still other cases about 90%. The lower limit on $CS^{R1}$ in some cases is 0% (ethylene homopolymer produced in R1), in other cases about 5% and in still other cases about 10%. The upper limit on $CS^{R2}$ in some cases is about 100% (i.e. 100% of the α-olefin is injected into reactor 2), in other cases about 95% and in still other cases about 90%. The lower limit on $CS^{R2}$ in some cases is 0% (ethylene homopolymer produced in R2), in other cases about 5% and in still other cases about 10%. The upper limit on $CS^{R3}$ in some cases is 100%, in other cases about 95% and in still other cases about 90%. The lower limit on $CS^{R3}$ in some cases is 0%, in other cases about 5% and in still other cases about 10%.

In an embodiment of the disclosure, a first polyethylene is produced with a single-site catalyst system in reactor 1. Referring to the embodiments shown in FIGS. 1-3, if the optional α-olefin is not added to reactor 1 (R1), then the first polyethylene produced in R1 is an ethylene homopolymer. If an α-olefin is added, then the first polyethylene produced in R1 is an ethylene copolymer and the following weight ratio is one parameter to control the density of the first polyethylene: $((\alpha\text{-olefin})/(\text{ethylene}))^{R1}$. The upper limit on $((\alpha\text{-olefin})/(\text{ethylene}))R1$ may be about 3; in other cases about 2 and in still other cases about 1. The lower limit on $((\alpha\text{-olefin})/(\text{ethylene}))^{R1}$ may be 0; in other cases about 0.25 and in still other cases about 0.5. Hereafter, the term "d1" refers to the density of the first polyethylene produced in R1. The upper limit on d1 may be about 0.975 g/cm³; in some cases about 0.965 g/cm³ and; in other cases about 0.955 g/cm³. The lower limit on d1 may be about 0.855 g/cm³, in some cases about 0.865 g/cm³, and; in other cases about 0.875 g/cm³.

In embodiments of the disclosure the density, d1 may be from about 0.875 g/cm³ to about 0.965 g/cm³, or from about 0.875 g/cm³ to about 0.960 g/cm³, or from about 0.875 g/cm³ to 0.950 g/cm³, or from about 0.865 g/cm³ to about 0.940 g/cm³, or from about 0.865 g/cm³ to about 0.936 g/cm³, or from about 0.865 g/cm³ to about 0.932 g/cm³, or from about 0.865 g/cm³ to about 0.926 g/cm³, or from about 0.865 g/cm³ to about 0.921 g/cm³, or from about 0.865 g/cm³ to about 0.918 g/cm³, or from about 0.875 g/cm³ to about 0.916 g/cm³, or from about 0.875 g/cm³ to about 0.916 g/cm³, or from about 0.865 g/cm³ to about 0.912 g/cm³, or from 0.880 g/cm³ to 0.912 g/cm³.

Methods to determine the $CDBI_{50}$ (Composition Distribution Branching Index) of an ethylene polymer are well known to those skilled in the art. The $CDBI_{50}$, expressed as a percent, is defined as the percent of the ethylene polymer whose comonomer composition is within 50% of the median comonomer composition. It is also well known to those skilled in the art that the $CDBI_{50}$ of ethylene polymers produced with single-site catalyst systems are higher relative to the $CDBI_{50}$ of α-olefin containing ethylene polymers produced with heterogeneous catalyst systems. The upper limit on the $CDBI_{50}$ of the first polyethylene (produced with a single-site catalyst system) may be about 98%, in other cases about 95% and in still other cases about 90%. The lower limit on the $CDBI_{50}$ of the first polyethylene may be about 70%, in other cases about 75% and in still other cases about 80%.

As is well known to those skilled in the art the $M_w/M_n$ of ethylene polymers produced with single site catalyst systems are lower relative to ethylene polymers produced with heterogeneous catalyst systems. The upper limit on the $M_w/M_n$ of the first polyethylene may be about 2.8, in other cases about 2.5, in other cases about 2.4, and in still other cases about 2.2. The lower limit on the $M_w/M_n$ the first polyethylene may be about 1.4, in other cases 1.6, in other cases about 1.7, in other cases about 1.8 and in still other cases about 1.9.

The first polyethylene may contain catalyst residues that reflect the chemical composition of the single-site catalyst system used. Those skilled in the art will understand that catalyst residues are typically quantified by the parts per million of metal in the first polyethylene, where metal refers to the metal in component (a), e.g. the metal in the "phosphinimine complex", herein referred to as $M^1$. The upper limit on the ppm of the metal $M^1$ in the first polyethylene may be about 5.0 ppm, in other cases about 2.5 ppm, or 2.0 ppm, or 1.0 ppm, or 0.9 ppm and in still other cases about 0.8 ppm. The lower limit on the ppm of metal $M^1$ in the first polyethylene may be about 0.01 ppm, in other cases about 0.1 ppm and in still other cases about 0.2 ppm.

The amount of hydrogen added to reactor 1 can vary over a wide range allowing the continuous solution process to produce polyethylenes that differ greatly in melt index, hereafter $I_2^1$ (melt index is measured at 190° C. using a 2.16 kg load following the procedures outlined in ASTM D1238). This is accomplished by adjusting the hydrogen flow rate in stream M (see FIGS. 1-3). The quantity of hydrogen added to R1 is expressed as the parts-per-million (ppm) of hydrogen in R1 relative to the total mass in reactor R1; hereafter $H_2^{R1}$ (ppm). In some cases $H_2^{R1}$ (ppm) ranges from about 100 ppm to 0 ppm, in other cases from about 50 ppm to 0 ppm, in alternative cases from about 20 ppm to 0 ppm and in still other cases from about 2 ppm to 0 ppm. The upper limit on $I_2^1$ may be about 200 dg/min, in some cases about 100 dg/min; in other cases about 50 dg/min, and; in still other cases about 1 dg/min. The lower limit on $I_2^1$ may be about 0.01 dg/min, in some cases about 0.05 dg/min; in other cases about 0.1 dg/min, and; in still other cases about 0.5 dg/min.

In embodiments of the disclosure the melt index of the first polyethylene $I_2^1$ may be from about 0.01 dg/min to about 100 dg/min, or from about 0.05 dg/min to about 50 dg/min, or from about 0.10 dg/min to about 50 dg/min, or from about 0.01 dg/min to about 25 dg/min, or from about 0.05 dg/min to about 25 dg/min, or from about 0.10 dg/min to about 25 dg/min, or from about 0.01 dg/min to about 10 dg/min, or from about 0.05 dg/min to about 10 dg/min, or from about 0.10 dg/min to about 10 dg/min, or from about 0.01 dg/min to about 5.0 dg/min, or from about 0.05 dg/min to about 5.0 dg/min, or from about 0.10 dg/min to about 5.0 dg/min, or from about 0.10 dg/min to about 3.0 dg/min, or from about 0.05 dg/min to about 3.0 dg/min, or from about 0.05 to 2.5 dg/min.

In an embodiment of the disclosure the melt index of the first polyethylene $I_2^1$ may be less than about 1.0 dg/min.

In an embodiment of the disclosure, the first polyethylene has a weight average molecular weight, $M_w$ of from about 40,000 to about 400,000, or from about 45,000 to about 300,000, or from about 50,000 to about 300,000, or from about 50,000 to about 250,000, or from about 50,000 to about 200,000; or from about 60,000 to about 400,000, or from about 60,000 to about 350,000, or from about 60,000 to about 300,000 or from about 60,000 to about 250,000, or from about 60,000 to about 200,000.

The upper limit on the weight percent (wt %) of the first polyethylene in the final polyethylene polymer product may be about 80 wt %, in other cases about 75 wt %, or about 70 wt %, or about 65 wt %, or about 60 wt %, or about 55 wt % and in still other cases about 50 wt %. The lower limit on the wt % of the first polyethylene in the final polyethylene product may be about 15 wt %; in other cases about 25 wt %, in other cases about 30 wt %, in other cases bout 35%, in still other cases about 40%.

In an embodiment of the disclosure, a second polyethylene is produced with a single-site catalyst system in reactor 2. The second polyethylene may be an ethylene homopolymer or an ethylene copolymer. Referring to the embodiments shown in FIGS. 1-3, if optional α-olefin is not added to reactor 2 through α-olefin stream H, then the second polyethylene produced in reactor 2 is an ethylene homopolymer. If an optional α-olefin is present then the second polyethylene produced in R2 is an ethylene copolymer and the following weight ratio is one parameter to control the density of the second polyethylene produced in R2: $((\alpha\text{-olefin})/(\text{ethylene}))^{R2}$. The upper limit on $((\alpha\text{-olefin})/(\text{ethylene}))^{R2}$ may be about 3; in other cases about 2 and in still other cases about 1. The lower limit on $((\alpha\text{-olefin})/(\text{ethylene}))^{R2}$ may be 0; in other cases about 0.25 and in still other cases about 0.5. Hereafter, the term "d2" refers to the density of the second polyethylene produced in R2. The upper limit on d2 may be about 0.975 g/cm³; in some cases about 0.965 g/cm³ and; in other cases about 0.955 g/cm³. Depending on the single site catalyst system used, the lower limit on d2 may be about 0.89 g/cm³, in some cases about 0.90 g/cm³, and; in other cases about 0.91 g/cm³.

In embodiments of the disclosure the density, d2 may be from about 0.921 g/cm³ to about 0.975 g/cm³, or from about 0.926 g/cm³ to about 0.975 g/cm³, or from about 0.930 g/cm³ to about 0.975 g/cm³, or from about 0.936 g/cm³ to about 0.975 g/cm³, or from about 0.940 g/cm³ to about 0.975 g/cm³, or from about 0.945 g/cm³ to about 0.975 g/cm³, or from about 0.950 g/cm³ to about 0.975 g/cm³, or from about 0.951 g/cm³ to about 0.975 g/cm³, or from about 0.953 g/cm³ to about 0.970 g/cm³, or from about 0.953 g/cm³ to about 0.959 g/cm³, or from about 0.955 g/cm³ to about 0.975 g/cm³, or from about 0.951 g/cm³ to about 0.959 g/cm³, or from 0.936 to about 0.970 g/cm³, or from about 0.940 g/cm³ to about 0.970 g/cm³, or from about 0.945 g/cm³ to about 0.970 g/cm³, or from about 0.950 g/cm³ to about 0.970 g/cm³.

The upper limit on the $CDBI_{50}$ of the second polyethylene (produced with a single-site catalyst system) may be about 98%, in other cases about 95% and in still other cases about 90%. The lower limit on the $CDBI_{50}$ of the second polyethylene may be about 70%, in other cases about 75% and in still other cases about 80%.

The upper limit on the $M_w/M_n$ of the second polyethylene may be about 2.8, in other cases about 2.5, in other cases about 2.4 and in still other cases about 2.2. The lower limit on the $M_w/M_n$ the second polyethylene may be about 1.4, in other cases about 1.6, in other cases about 1.7, in other cases about 1.8 and in still other cases about 1.9.

The second polyethylene may contain catalyst residues that reflect the chemical composition of the single-site catalyst system used. Those skilled in the art will understand that catalyst residues are typically quantified by the parts per million of metal in the second ethylene polymer, where metal refers to the metal in component (a), i.e., the metal in the "phosphinimine complex", herein referred to as $M^2$. The upper limit on the ppm of the metal $M^2$ in the second polyethylene may be about 5.0 ppm, or about 2.5 ppm, or about 1.0 ppm, or in other cases about 0.9 ppm and in still other cases about 0.8 ppm. The lower limit on the ppm of metal $M^2$ in the second polyethylene may be about 0.01 ppm, in other cases about 0.1 ppm and in still other cases about 0.2 ppm.

The amount of hydrogen added to R2 can vary over a wide range allowing the continuous solution process to produce second polyethylenes that differ greatly in melt index, hereafter $I_2^2$ (melt index is measured at 190° C. using a 2.16 kg load following the procedures outlined in ASTM D1238). This is accomplished by adjusting the hydrogen flow rate in stream N (see FIGS. 1-3). The quantity of hydrogen added to R2 is expressed as the parts-per-million (ppm) of hydrogen in R2 relative to the total mass in reactor R2; hereafter $H_2^{R2}$ (ppm). In some cases $H_2^{R2}$ (ppm) ranges from about 100 ppm to 0 ppm, in other cases from about 50 ppm to 0 ppm, in alternative cases from about 20 ppm to 0 ppm and in still other cases from about 2 ppm to 0 ppm. The upper limit on $I_2^2$ may be about 20,000 dg/min; in some cases about 10,000 dg/min; in other cases about 1500 dg/min, and; in still other cases about 1000 dg/min. The lower limit on $I_2^2$ may be about 0.3 dg/min, in some cases about 0.4 dg/min, in other cases about 0.5 dg/min, and; in still other cases about 0.6 dg/min.

In embodiments of the disclosure the melt index of the second polyethylene $I_2^2$ may be from about 0.5 dg/min to about 10,000 dg/min, or from about 0.5 dg/min to about 1000 dg/min, or from about 1.0 dg/min to about 10,000 dg/min, or from about 1.0 dg/min to about 1000 dg/min, or from about 0.5 dg/min to about 500 dg/min, or from about 1.0 dg/min to about 500 dg/min, or from about 0.5 dg/min to about 100 dg/min, or from about 1.0 dg/min to about 100 dg/min, or from about 0.5 dg/min to about 75 dg/min, or from about 1.0 dg/min to about 75 dg/min, or from about 0.5 dg/min to about 50 dg/min, or from about 1.0 dg/min to about 50 dg/min, or from about 0.5 dg/min to about 25 dg/min, or from about 1.0 dg/min to about 25 dg/min, or from about 0.5 dg/min to about 20 dg/min, or from about 1.0 dg/min to about 20 dg/min, or from about 0.5 dg/min to about 15 dg/min, or from about 1.0 dg/min to about 15 dg/min, or from about 0.5 dg/min to about 10 dg/min, or from about 1.0 dg/min to about 12.0 dg/min, or from about 1.0 dg/min to about 10 dg/min.

In an embodiment of the disclosure, the second polyethylene has a weight average molecular weight, $M_w$ of from about 20,000 to about 150,000, or from about 25,000 to about 130,000, or from about 20,000 to about 120,000, or from about 25,000 to about 100,000, or from about 30,000 to about 120,000; or from about 30,000 to about 100,000.

The upper limit on the weight percent (wt %) of the second polyethylene in the final polyethylene product may be about 85 wt %, in other cases about 80 wt %, in other cases about 70 wt %, or about 65 wt %, or about 60 wt %, or about 55 wt %, or about 50 wt %, or about 45 wt %, or about 40 wt % or about 35 wt %. The lower limit on the wt % of the second polyethylene in the final polyethylene product may be about 5 wt %, or about 10 wt %, or about 15 wt %, or about 20 wt %, or in other cases about 30 wt %.

In an embodiment of the disclosure, the first polyethylene may have a higher weight average molecular weight $M_w$, than the weight average molecular weight $M_w$, of the second polyethylene polymer.

Optionally, a second catalyst system may be added to the third reactor, R3. The second catalyst system may be a single site catalyst system or a Ziegler-Natta catalyst system.

A third polyethylene is produced in reactor 3. Either active catalyst flows from reactor 1 and/or 2, and/or a fresh polymerization catalyst system is added to reactor 3.

If optional α-olefin is not added to reactor 3, either by fresh α-olefin stream I or carried over from reactors 1 and/or 2 in combined exits streams 1' and 2' (FIG. 1), or exit stream 1' (FIG. 2), or exit stream 2' (FIG. 3), then the third polymer formed in reactor 3 is an ethylene homopolymer. If optional α-olefin is added to reactor 3, either by fresh α-olefin stream I and/or carried over from reactors 1 and/or 2 in combined exits streams 1' and 2' (FIG. 1), or exit stream 1' (FIG. 2), or exit stream 2' (FIG. 3), then the third polymer formed in reactor 3 is an ethylene copolymer and the following weight ratio determines the density of the third polyethylene: $((\alpha\text{-olefin})/(\text{ethylene}))^{R3}$. In the continuous solution polymerization process $((\alpha\text{-olefin})/(\text{ethylene}))^{R3}$ is one of the control parameters used to produce a third ethylene polyethylene with a desired density. The upper limit on $((\alpha\text{-olefin})/(\text{ethylene}))^{R3}$ may be about 3; in other cases about 2 and in still other cases about 1. The lower limit on $((\alpha\text{-olefin})/(\text{ethylene}))^{R3}$ may be 0; in other cases about 0.25 and in still other cases about 0.5. Hereafter, the term "d3" refers to the density of the ethylene polymer produced in R3. The upper limit on d3 may be about 0.975 g/cm$^3$; in some cases about 0.965 g/cm$^3$ and; in other cases about 0.955 g/cm$^3$. Depending on the catalyst system used, the lower limit on d3 may be about 0.865 g/cm$^3$, in some cases about 0.875 g/cm$^3$, in some cases about 0.88 g/cm$^3$, in some cases about 0.89 g/cm$^3$, in some cases about 0.90 g/cm$^3$, and; in other cases about 0.91 g/cm$^3$.

In embodiments of the disclosure the density of the third polyethylene, d3 may be from about 0.875 g/cm$^3$ to about 0.965 g/cm$^3$, or from about 0.875 g/cm$^3$ to about 0.960 g/cm$^3$, or from about 0.875 g/cm$^3$ to about 0.955 g/cm$^3$, or from about 0.875 g/cm$^3$ to about 0.950 g/cm$^3$, or from about 0.88 g/cm$^3$ to about 0.945 g/cm$^3$, or from about 0.89 g/cm$^3$ to about 0.941 g/cm$^3$, or from about 0.89 g/cm$^3$ to about 0.940 g/cm$^3$, or from about 0.89 g/cm$^3$ to about 0.936 g/cm$^3$, or from about 0.875 g/cm$^3$ to about 0.936 g/cm$^3$, or from about 0.880 g/cm$^3$ to about 0.936 g/cm$^3$, or from about 0.880 g/cm$^3$ to about 0.935 g/cm$^3$, or from about 0.880 g/cm$^3$ to about 0.932 g/cm$^3$, or from about 0.88 g/cm$^3$ to about 0.930 g/cm$^3$, or from about 0.875 g/cm$^3$ to about 0.925 g/cm$^3$, or from about 0.89 g/cm$^3$ to about 0.926 g/cm$^3$.

The upper limit on the $M_w/M_n$ of the third polyethylene may be about 8.0, or about 7.0, or about 6.5, or about 6.0, in other cases about 5.5, or about 5.0 and in still other cases about 4.8. The lower limit on the $M_w/M_n$ of the third polyethylene may be about 4.0, or about 3.5, or about 3.0, or about 2.6, or about 2.5.

In an embodiment of the disclosure, the $M_w/M_n$ of the third polyethylene may be from about 2.2 to about 7.0, or from about 2.4 to about 6.5, or from about 2.6 to about 6.0, or from about 2.8 to about 5.5, or from about 3.0 to about 6.0, or from about 3.0 to about 5.5.

In an embodiment of the disclosure, the $M_w/M_n$ of the third polyethylene is higher than the $M_w/M_n$ of the first polyethylene.

In an embodiment of the disclosure, the $M_w/M_n$ of the third polyethylene is higher than the $M_w/M_n$ of the second polyethylene.

In an embodiment of the disclosure, the $M_w/M_n$ of the third polyethylene is higher than the $M_w/M_n$ of both the first and second polyethylene.

In an embodiment of the disclosure the third polyethylene has a higher weight average molecular weight than the weight average molecular weight of the second polyethylene.

In an embodiment of the disclosure the first polyethylene and the third polyethylene each have a higher weight average molecular weight than the weight average molecular weight of the second polyethylene.

Referring to the embodiments shown in FIGS. 1-3, optional hydrogen may be added to the reactor 3 via stream O. The amount of hydrogen added to R3 may vary over a wide range. Adjusting the amount of hydrogen in R3, hereafter $H_{2R3}$ (ppm), allows the continuous solution process to produce third polyethylenes that differ widely in melt index, hereafter $I_2^3$. The amount of optional hydrogen added to R3 ranges from about 50 ppm to 0 ppm, in some cases from about 25 ppm to 0 ppm, in other cases from about 10 to 0 and in still other cases from about 2 ppm to 0 ppm. The upper limit on $I_2^3$ may be about 2000 dg/min; in some cases about 1500 dg/min; in other cases about 1000 dg/min, and; in still other cases about 500 dg/min. The lower limit on $I_2^3$ may be about 0.5 dg/min, in some cases about 0.6 dg/min, in other cases about 0.7 dg/min, and; in still other cases about 0.8 dg/min.

In embodiments of the disclosure the melt index of the third polyethylene $I_2^3$ may be from about 0.01 dg/min to about 10,000 dg/min or from about 0.05 dg/min to about 10,000 dg/min, or from about 0.10 to about 10,000, or from about 0.5 dg/min to about 10,000 dg/min, or from about 1.0 dg/min to about 10,000 dg/min, or from about 0.1 dg/min to about 5000 dg/min, or from about 0.5 dg/min to about 5000 dg/min, or from about 0.01 dg/min to about 1000 dg/min, or from about 0.05 to 1000 dg/min, or from about 0.10 dg/min to about 1000 dg/min, or from about 0.5 dg/min to about 1000 dg/min, or from about 1.0 dg/min to about 1000 dg/min, or from about 0.01 dg/min to about 500 dg/min, or from about 0.05 dg/min to about 500 dg/min, or from about 0.10 dg/min to about 500 dg/min, or from about 0.1 dg/min to about 250 dg/min, or from about 0.5 dg/min to about 250 dg/min, or from about 1.0 dg/min to about 250 dg/min, or from about 0.01 dg/min to about 200 dg/min, or from about 0.05 dg/min to about 200 dg/min, or from about 0.1 dg/min to about 200 dg/min, or from about 0.01 dg/min to about 100 dg/min, or from about 0.05 dg/min to about 100 dg/min, or from about 0.10 dg/min to 100 dg/min, or from about 0.01 dg/min to about 50 dg/min, or from about 0.05 dg/min to about 50 dg/min, or from about 0.10 dg/min to about 50 dg/min, or from about 0.01 dg/min to about 25 dg/min, or from about 0.05 dg/min to about 25 dg/min, or from about 0.10 dg/min to about 25 dg/min, or from 0.01 dg/min to about 10 dg/min, or from 0.50 dg/min to about 10 dg/min, or from 0.10 dg/min to about 10 dg/min, or from about 0.01 dg/min to about 5.0 dg/min, or from about 0.1 dg/min to about 5 dg/min, or from about 0.01 dg/min to about 3 dg/min, or from about 0.1 dg/min to about 3 dg/min.

In an embodiment of the disclosure, the third polyethylene has a weight average molecular weight, $M_w$, of from about 20,000 to about 400,000, or from about 20,000 to about 300,000, or from about 20,000 to about 250,000, or from about 25,000 to about 225,000, or from about 25,000 to about 200,000; or from about 20,000 to about 175,000, or from about 20,000 to about 150,000.

The upper limit on the weight percent (wt %) of the third ethylene polymer in the final ethylene polymer product may be about 45 wt %, in other cases about 40 wt %, in other cases about 35 wt %, and in still other cases about 30 wt %. The lower limit on the wt % of the optional third ethylene polymer in the final ethylene polymer product may be about 1 wt %; in other cases about 5 wt %, in other cases about 10 wt %, in other cases about 15 wt %, in other cases about 20 wt %, and in still other cases about 25 wt %.

The Final Polyethylene Product Composition

The "final polyethylene product composition" (used herein interchangeably with the terms "polyethylene product composition" and "polyethylene product") comprises a first polyethylene, a second polyethylene and a third polyethylene (as described above). Despite this fact, in an embodiment of the disclosure, the polyethylene product composition has a unimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. In contrast, the use of the term "bimodal" is meant to convey that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, in some embodiments more than two, maxima in a molecular weight distribution curve generated according to the method of ASTM D6474-99.

In an embodiment of the disclosure, the polyethylene product satisfies the following relationship: [(weight average molecular weight of the second polyethylene)−(weight average molecular weight of the first polyethylene)]/(weight average molecular weight of the second polyethylene)×100%≥−140%. In an embodiment of the disclosure, the polyethylene product satisfies the following relationship: [(weight average molecular weight of the second polyethylene)−(weight average molecular weight of the first polyethylene)]/(weight average molecular weight of the second polyethylene)×100%≥−130%. In an embodiment of the disclosure, the polyethylene product satisfies the following relationship: [(weight average molecular weight of the second polyethylene)−(weight average molecular weight of the first polyethylene)]/(weight average molecular weight of the second polyethylene)×100%≥−120%. In an embodiment of the disclosure, the polyethylene product satisfies the following relationship: [(weight average molecular weight of the second polyethylene)−(weight average molecular weight of the first polyethylene)]/(weight average molecular weight of the second polyethylene)×100%≥−110%. In an embodiment of the disclosure, the polyethylene product satisfies the following relationship: [(weight average molecular weight of the second polyethylene)−(weight average molecular weight of the first polyethylene)]/(weight average molecular weight of the second polyethylene)×100%≥−100%.

In an embodiment of the disclosure, the polyethylene product satisfies the following relationship: [(weight average molecular weight of the third polyethylene)−(weight average molecular weight of the second polyethylene)]/(weight average molecular weight of the third polyethylene)×100%≥−100%. In an embodiment of the disclosure, the polyethylene product satisfies the following relationship: [(weight average molecular weight of the third polyethylene)−(weight average molecular weight of the second polyethylene)]/(weight average molecular weight of the third polyethylene)×100%≥−75%. In an embodiment of the disclosure, the polyethylene product satisfies the following relationship: [(weight average molecular weight of the third polyethylene)−(weight average molecular weight of the second polyethylene)]/(weight average molecular weight of the third polyethylene)×100%≥−50%. In an embodiment of the disclosure, the polyethylene product satisfies the following relationship: [(weight average molecular weight of the third polyethylene)−(weight average molecular weight of the second polyethylene)]/(weight average molecular weight of the third polyethylene)×100%≥−40%. In an embodiment of the disclosure, the polyethylene product satisfies the following relationship: [(weight average molecular weight of the third polyethylene)−(weight average molecular weight of the second polyethylene)]/(weight average molecular weight of the third polyethylene)×100%≥−30%.

In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−350%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−300%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−250%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−225%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−200%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−175%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−150%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−100%. In an embodiment of the disclosure, the polyethylene composition satisfies the following relationship: [(weight average molecular weight of the third polyethylene)−(weight average molecular weight of the first polyethylene)]/(weight average molecular weight of the third polyethylene)×100%≥−50%.

The upper limit on the density of the polyethylene product may be about 0.975 g/cm$^3$; in some cases about 0.965 g/cm$^3$ and; in other cases about 0.955 g/cm$^3$. The lower limit on the density of the polyethylene product may be about 0.869 g/cm$^3$, in some cases about 0.879 g/cm$^3$, and; in other cases about 0.889 g/cm$^3$.

In embodiments of the disclosure, the density of the polyethylene product may be from about 0.879 g/cm$^3$ to about 0.940 g/cm$^3$, or from about 0.879 g/cm$^3$ to about 0.939 g/cm$^3$, or from about 0.879 g/cm$^3$ to about 0.936 g/cm$^3$, or from about 0.890 g/cm$^3$ to about 0.939 g/cm$^3$, or from about 0.890 to about 0.936 g/cm$^3$, or from about 0.879 g/cm$^3$ to about 0.932 g/cm$^3$, or from about 0.89 g/cm$^3$ to about 0.934 g/cm$^3$, or from about 0.890 g/cm$^3$ to about 0.932 g/cm$^3$, or from about 0.890 g/cm$^3$ to about 0.930 g/cm$^3$, or from about 0.890 to about 0.928 g/cm$^3$, or from about 0.890 to about 0.926 g/cm$^3$, or from about 0.890 g/cm$^3$ to about 0.924 g/cm$^3$, or from about 0.890 g/cm$^3$ to about 0.921 g/cm$^3$, or from about 0.890 g/cm$^3$ to about 0.918 g/cm$^3$.

In an embodiments of the disclosure, the density of the polyethylene product may be less than about 0.941 g/cm$^3$, or less than about 0.940 g/cm$^3$, or less than about 0.939 g/cm$^3$, or ≤about 0.939 g/cm$^3$.

The upper limit on the CDBI$_{50}$ of the final polyethylene product may be about 97%, in other cases about 90% and in still other cases about 85%. A final polyethylene product with a CDBI$_{50}$ of 97% may result if an α-olefin is not added to the continuous solution polymerization process; in this case, the final polyethylene product is an ethylene homopolymer. The lower limit on the CDBI$_{50}$ of a final polyethylene product may be about 20%, in other cases about 40% and in still other cases about 60%.

In an embodiment of the disclosure the polyethylene product may have a CDBI$_{50}$ of greater than about 40%. In further embodiments of the disclosure the polyethylene product may have a CDBI$_{50}$ of from about 35 to 95%, or from 40 to 85%, or from about 40 to about 75%.

The upper limit on the $M_w/M_n$ of the final polyethylene product may be about 25, in other cases about 15 and in still other cases about 9. The lower limit on the $M_w/M_n$ of the final polyethylene product may be 2.0, in other cases about 2.1, or about 2.2.

In an embodiment of the disclosure the polyethylene product, may have a $M_w/M_n$ of from about 2.1 to about 3.6, or from about 2.0 to about 3.5, or from about 2.1 to about 3.4, or from about 2.1 to about 3.2, or from about 2.1 to about 3.0, or from about 2.0 to about 3.0, or from about 2.0 to about 2.8.

In an embodiment of the disclosure the polyethylene product, may have a $M_z/M_w$ of less than about 4.0, or less than about 3.5, or less than about 3.0, or less than about 2.5, or less than about 2.3, or less than about 2.1. In embodiments of the disclosure, the polyethylene product may have a $M_z/M_w$ from about 1.6 to about 4.5, or from about 1.6 to about 4.0, or from about 1.6 to about 3.5, or from about 1.6 to about 3.2, or from about 1.6 to about 3.0, or from about 1.8 to about 3.2, or from about 1.8 to about 3.0, or from about 1.6 to about 3.0, or from about 1.8 to about 2.8, or from about 1.8 to about 2.5, or from about 1.6 to about 2.3, or from about 1.8 to about 2.3.

In an embodiment of the disclosure, the polyethylene product has a stress exponent of less than 1.5, or less than 1.4, or less than 1.3, wherein the stress exponent is defined by the following relationship: S.Ex.=log $(I_6/I_2)$/log(6480/2160); wherein $I_6$ and $I_2$ are the melt indexes measured at 190° C. using 6.48 kg and 2.16 kg loads respectively.

Catalyst residues may be quantified by measuring the parts per million of catalytic metal in the final polyethylene product. Catalytic metals originate from two or optionally three sources, specifically: 1) metals that originate from component (a) that was used to form the single-site catalyst system used in reactors 1 and 2; and optionally "metals" that originate from the second system that may be used in reactor 3.

The upper limit on melt index $I_2$ of the polyethylene product may be about 500 dg/min, in some cases about 400 dg/min; in other cases about 300 dg/min, and; in still other cases about 200 dg/min. The lower limit on the melt index of the final polyethylene product may be about 0.1 dg/min, or 0.2 dg/min, or 0.3 dg/min, in some cases about 0.4 dg/min; in other cases about 0.5 dg/min, and; in still other cases about 0.6 dg/min.

In embodiments of the present disclosure, the polyethylene product may have a melt index $I_2$ of from about 0.05 dg/min to about 500 dg/min, or from about 0.1 dg/min to about 400 dg/min, or from 0.1 dg/min to about 300 dg/min, or from about 0.1 dg/min to about 200 dg/min, or from about 0.1 dg/min to about 100 dg/min, or from 0.1 dg/min to about 50 dg/min, or from about 0.1 dg/min to about 25 dg/min, or from about 0.1 dg/min to about 20 dg/min, or from about 0.1 dg/min to about 15 dg/min, or from about 0.1 dg/min to about 10 dg/min, or from about 0.1 dg/min to about 5.0 dg/min, or from about 0.1 dg/min to about 3.0 dg/min.

In an embodiment of the disclosure, the polyethylene product may have a melt index ratio, $I_{21}/I_2$ of from about 10 to about 35, wherein $I_{21}$ and $I_2$ are the melt indexes measured at 190° C. using 21.16 kg and 2.16 kg loads respectively. In another embodiment of the disclosure, the polyethylene product may have a melt index ratio, $I_{21}/I_2$ of from about 10 to about 30. In yet another embodiment of the disclosure, the polyethylene product may have a melt index ratio $I_{21}/I_2$ of less than about 30.

In an embodiment of the disclosure the polyethylene product may have a unimodal profile in a gel permeation chromatograph.

In an embodiment of the disclosure the polyethylene product may have a multimodal TREF profile in a temperature rising elution fractionation graph. In the context of TREF analysis, the term "multimodal" connotes a TREF profile in which two or more distinct elution peaks are observable.

In an embodiment of the disclosure the polyethylene product may have a trimodal TREF profile in a temperature rising elution fractionation graph. In the context of TREF analysis, the term "trimodal" connotes a TREF profile in which three distinct elution peaks are observable.

In an embodiment of the disclosure the polyethylene product may have at least about 10 weight percent of the product eluting at a temperature of from 90° C. to 100° C. in a TREF analysis. In another embodiment of the disclosure the polyethylene product may have at least about 15 weight percent of the product eluting at a temperature of from 90° C. to 100° C. in a TREF analysis. In another embodiment of the disclosure the polyethylene product may have at least about 17.5 weight percent of the product eluting at a temperature of from 90° C. to 100° C. in a TREF analysis. In another embodiment of the disclosure the polyethylene product may have at least about 20 weight percent of the product eluting at a temperature of from 90° C. to 100° C. in a TREF analysis. In another embodiment of the disclosure the polyethylene product may have at least about 22.5 weight percent of the product eluting at a temperature of from 90° C. to 100° C. in a TREF analysis. In another embodiment of the disclosure the polyethylene product may have at least about 25 weight percent of the product eluting at a temperature of from 90° C. to 100° C. in a TREF analysis.

In an embodiment of the disclosure the polyethylene product may have a multimodal profile in a differential scanning calorimetry (DSC) graph. In the context of DSC analysis, the term "multimodal" connotes a DSC profile in which two or more distinct peaks are observable.

In an embodiment of the disclosure the polyethylene product may have a trimodal profile in a differential scanning calorimetry (DSC) graph. In the context of DSC analysis, the term "trimodal" connotes a DSC profile in which three distinct peaks are observable.

In an embodiment of the disclosure, the polyethylene product will have will have an inverse (i.e. "reverse") or partially inverse comonomer distribution profile as measured using GPC-FTIR. If the comonomer incorporation decreases with molecular weight, as measured using GPC-FTIR, the distribution is described as "normal". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than is one or more lower molecular weight components. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

In an embodiment of the disclosure the polyethylene product has a reversed comonomer distribution profile as measured using GPC-FTIR.

In an embodiment of the disclosure the polyethylene product has a partially reverse comonomer distribution profile as measured using GPC-FTIR.

In an embodiment of the disclosure the polyethylene product has a "partially reverse" comonomer distribution profile and shows a peak or a maximum in the comonomer distribution profile as measured using GPC-FTIR.

In an embodiment of the disclosure the polyethylene product is produced in a continuous solution polymerization process.

In an embodiment of the disclosure the polyethylene product is produced in a continuous solution polymerization process comprising a first and second reactor configured in parallel in parallel to one another.

In an embodiment of the disclosure the polyethylene product is produced in a continuous solution polymerization process comprising a first, second and third reactor, where the first and second reactor are configured in parallel to one another, and the third reactor receives the combined effluent streams from the first and second reactors.

In an embodiment of the disclosure the first polyethylene is produced with a single site catalyst system.

In an embodiment of the disclosure the first polyethylene is homogeneous polyethylene.

In an embodiment of the disclosure the second polyethylene is produced with a single site catalyst system.

In an embodiment of the disclosure the second polyethylene is homogeneous polyethylene.

In an embodiment of the disclosure the third polyethylene is produced with single site catalyst system.

In an embodiment of the disclosure the third polyethylene is produced with a Ziegler-Natta catalyst system.

In an embodiment of the disclosure the first polyethylene and the second polyethylene are produced with a single site catalyst system.

In an embodiment of the disclosure the first polyethylene and the second polyethylene are homogeneous polyethylenes.

In an embodiment of the disclosure the first polyethylene, the second polyethylene and the third polyethylene are produced with a single site catalyst system.

In an embodiment of the disclosure the first polyethylene and the second polyethylene are produced with a single site catalyst system, while the third polyethylene is produced with a Ziegler-Natta catalyst system.

In an embodiment of the disclosure the polyethylene product has substantially no long chain branching. By the term "substantially no long chain branching", it is meant that the polyethylene product has less than 0.03 long chain branches per thousand carbons.

In an embodiment of the disclosure the polyethylene product has a storage modulus G'(@G"=500 Pa) value of less than about 38, or less than about 36, or less than about 34.

In an embodiment of the disclosure, the polyethylene product has a DRI, of less than about 0.55, wherein the DRI, is the "dow rheology index", defined by the equation: $DRI=[365000(T_0/\eta_0)-1]/10$; wherein $T_0$ is the characteristic relaxation time of the polyethylene and no is the zero shear viscosity of the material. The DRI is calculated by least squares fit of the rheological curve (dynamic complex viscosity versus applied frequency e.g. 0.01-100 rads/s) as described in U.S. Pat. No. 6,114,486 with the following generalized Cross equation, i.e. $\eta(\omega)=\eta_0/[1+(\omega_{T_0})^n]$; wherein n is the power law index of the material, $\eta(\omega)$ and $\omega$ are the measured complex viscosity and applied frequency data respectively.

In an embodiment of the disclosure, the polyethylene product has a DRI of $\leq 0.55$, or $\leq 0.50$, or $\leq 0.45$, or $\leq 0.40$, or $\leq 0.35$, or $\leq 0.30$.

The catalyst residues in the polyethylene product reflect the chemical compositions of: the single-site catalyst system employed in reactors 1 and 2, and if present, the second catalyst system employed in reactor 3.

The catalyst residues in the polyethylene product reflect the chemical compositions of: the single-site catalyst system employed in reactors 1 and 2, and if present, the second catalyst system employed in reactor 3.

The polyethylene products disclosed herein may be converted into flexible manufactured articles such as monolayer or multilayer films, such films are well known to those experienced in the art; non-limiting examples of processes to prepare such films include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, example extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however the various thermoplastic materials are metered into a flat die and extruded into a monolayer or multilayer sheet, rather than a tube. In the cast film process the extruded sheet is solidified on a chill roll.

Depending on the end-use application, the disclosed polyethylene products may be converted into films that span a wide range of thicknesses. Non-limiting examples include, food packaging films where thicknesses may range from about 0.5 mil (13 μm) to about 4 mil (102 μm), and; in heavy duty sack applications film thickness may range from about 2 mil (51 μm) to about 10 mil (254 μm).

The polyethylene products disclosed herein may be used in monolayer films; where the monolayer may contain more than one polyethylene product and/or additional thermoplastics; non-limiting examples of thermoplastics include polyethylene polymers and propylene polymers. The lower limit on the weight percent of the polyethylene product in a monolayer film may be about 3 wt %, in other cases about 10 wt % and in still other cases about 30 wt %. The upper limit on the weight percent of the polyethylene product in the monolayer film may be 100 wt %, in other cases about 90 wt % and in still other cases about 70 wt %.

The polyethylene products disclosed herein may also be used in one or more layers of a multilayer film; non-limiting examples of multilayer films include three, five, seven, nine, eleven or more layers. The thickness of a specific layer (containing an polyethylene product) within a multilayer film may be about 5%, in other cases about 15% and in still other cases about 30% of the total multilayer film thickness. In other embodiments, the thickness of a specific layer (containing the polyethylene product) within a multilayer film may be about 95%, in other cases about 80% and in still other cases about 65% of the total multilayer film thickness. Each individual layer of a multilayer film may contain more than one polyethylene product and/or additional thermoplastics.

Additional embodiments include laminations and coatings, wherein mono or multilayer films containing the disclosed polyethylene products are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. In some embodiments, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of a polyethylene product containing web to a polyester or polyamide web. Prior to lamination, the web containing the disclosed polyethylene product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include; polyamide, polyester and polypropylene, or webs containing barrier resin layers such as EVOH. Such webs may also contain a vapor deposited barrier layer; for example a thin silicon oxide ($SiO_x$) or aluminum oxide ($AlO_x$) layer. Multilayer webs (or films) may contain three, five, seven, nine, eleven or more layers.

The polyethylene products disclosed herein can be used in a wide range of manufactured articles comprising one or more films or film layers (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles comprising one or more films containing at least one polyethylene product include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed polyethylene products.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed polyethylene products are easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

In an embodiment of the disclosure, a film or film layer comprises the polyethylene product described above.

In embodiments of the disclosure, a film will have a dart impact of ≥500 g/mil, or ≥550 g/mil, or ≥600 g/mil, or ≥650 g/mil, or ≥700 g/mil. In another embodiment of the disclosure, a film will have a dart impact of from 500 g/mil to 950 g/mil. In a further embodiment of the disclosure, a film will have dart impact of from 550 g/mil to 850 g/mil. In yet another embodiment of the disclosure, the film will have dart impact of from 600 g/mil to 850 g/mil. In still yet another embodiment of the disclosure, a film will have dart impact of from 600 g/mil to 800 g/mil.

In embodiments of the disclosure, a 1 mil film will have a machine direction (MD) secant modulus at 1% strain of ≥150 MPa, or ≥160 MPa, or ≥170 MPa, or ≥175 MPa, or ≥180 MPa, or ≥185 MPa, or ≥190 MPa, or ≥195 MPa, or ≥200 MPa.

In an embodiment of the disclosure, a 1 mil film will have a machine direction (MD) secant modulus at 1% strain of from 150 MPa to 240 MPa. In an embodiment of the disclosure, a 1 mil film will have a machine direction (MD) secant modulus at 1% strain of from 160 MPa to 230 MPa. In another embodiment of the disclosure, a 1 mil film will have a machine direction (MD) secant modulus at 1% strain of from 170 MPa to 230 MPa. In yet another embodiment of the disclosure, a 1 mil film will have a machine direction (MD) secant modulus at 1% strain of from 170 MPa to 220 MPa.

In an embodiment of the disclosure, a 1 mil film will have a transverse direction (TD) secant modulus at 1% strain of ≥190 MPa, or ≥200 MPa, or ≥210 MPa, or ≥220 MPa, or ≥230 MPa. In an embodiment of the disclosure, a 1 mil film will have a transverse direction (TD) secant modulus at 1% strain of from 180 MPa to 400 MPa. In another embodiment of the disclosure, a 1 mil film will have a transverse direction (TD) secant modulus at 1% strain of from 180 MPa to 300 MPa. In yet another embodiment of the disclosure, a 1 mil film will have a transverse direction (TD) secant modulus at 1% strain of from 200 MPa to 280 MPa.

In embodiments of the disclosure, a 1 mil film will have a machine direction (MD) tensile strength at break of ≥35

MPa, or ≥40 MPa, or ≥45 MPa, or ≥50 MPa, or ≥55 MPa. In an embodiment of the disclosure, a 1 mil film will have a machine direction tensile strength at break of from 30 MPa to 70 MPa. In an embodiment of the disclosure, a 1 mil film will have a machine direction (MD) tensile strength at break of from 35 MPa to 65 MPa. In another embodiment of the disclosure, a 1 mil film will have a machine direction (MD) tensile strength at break of from 40 MPa to 65 MPa.

In embodiments of the disclosure, a film will have a machine direction (MD) tear strength of ≥200 g/mil, or ≥210 g/mil, or ≥220 g/mil, or ≥230 g/mil, or ≥240 g/mil, or ≥250 g/mil, or ≥260 g/mil, or ≥270 g/mil, or ≥275 g/mil. In an embodiment of the disclosure, a film will have a machine direction (MD) tear strength of from 220 g/mil to 375 g/mil. In an embodiment of the disclosure, a film will have a machine direction (MD) tear strength of from 230 g/mil to 375 g/mil. In an embodiment of the disclosure, a film will have a machine direction (MD) tear strength of from 240 g/mil to 375 g/mil. In an embodiment of the disclosure, a film will have a machine direction (MD) tear strength of from 250 g/mil to 375 g/mil. In an embodiment of the disclosure, a film will have a machine direction (MD) tear strength of from 250 g/mil to 350 g/mil.

In embodiments of the disclosure, a 1 mil film will have a slow puncture resistance value of ≥55 J/mm, or ≥60 J/mm, or ≥65 J/mm, or ≥70 J/mm, or ≥75 J/mm, or ≥80 J/mm, or ≥85 J/mm. In embodiments of the disclosure, a 1 mil film will have a slow puncture value of from 55 J/mm to 95 J/mm, or from 60 J/mm to 90 J/mm, or from 65 J/mm to 90 J/mm.

In embodiments of the disclosure, a 1 mil film will have a haze of ≤16%, or ≤15%, ≤14%, or ≤13%, or ≤12%, or ≤11%, or ≤10%. In embodiments of the disclosure, a 1 mil film will have a haze of from 6% to 16%, or from 8% to 14%.

In embodiments of the disclosure, a 1 mil film[1] will have a seal initiation temperature of ≤115° C., or ≤110° C., or ≤105° C., or ≤100° C. In an embodiment of the disclosure, a 1 mil film will have a seal initiation temperature (SIT) of between 90° C. and 115° C. In an embodiment of the disclosure, a film will have a seal initiation temperature (SIT) of between 95° C. and 105° C. In an embodiment of the disclosure, a film will have a seal initiation temperature (SIT) of between 95° C. and 100° C. In an embodiment of the disclosure, a film will have a seal initiation temperature (SIT) of between 90° C. and 100° C.

Some embodiments of the present disclosure provide films with improvements in at least two or more of the following properties: dart impact, machine direction (MD) modulus (1% and/or 2%), machine direction (MD) tensile strength at break, machine direction (MD) tear, slow puncture resistance, haze, and seal initiation temperature relative to films formed from comparative polyethylenes. Hence, in an embodiment of the disclosure, a 1 mil film has a dart impact strength of ≥600 g/mil, a MD 1% secant modulus of ≥170 MPa, a MD tensile strength at break of ≥40 MPa, a machine direction (MD) tear of ≥250 g/mil, a slow puncture value of ≥65 J/mm, a haze of less ≤14%, and a seal initiation temperature (SIT) of ≤105° C. In another embodiment of the disclosure, a 1 mil film has a dart impact strength of ≥600 g/mil, a MD 1% secant modulus of ≥170 MPa, a slow puncture value of ≥65 J/mm, a machine direction (MD) tear of ≥250 g/mil, and seal initiation temperature (SIT) of ≤105° C.

In an embodiment of the disclosure, the films manufactured using the inventive compositions will have good hot tack performance. Good hot tack performance is generally associated with good film performance in bag or pouch packaging lines, such as vertical-form-fill-seal (VFFS) applications lines. Without wishing to be bound by theory, in the hot tack profile (seal temperature vs. force), good hot tack performance is indicated by an early (or low) hot tack initiation temperature, then a relatively high force over a wide range of seal temperatures.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

The ethylene polymer products disclosed herein may be used to produce rigid manufactured articles, non-limiting examples include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging, and; truck bed liners, pallets and automotive dunnage. The rigid manufactured articles summarized in this paragraph contain one or more of the ethylene polymer products disclosed herein or a blend of at least one of the ethylene polymer products disclosed herein with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance, and; color (whiteness and/or yellowness index).

A further objective of the present disclosure is to provide rigid manufactured articles comprising the ethylene polymer products disclosed herein that have improvements in at least one desirable physical property; relative to rigid manufactured articles formed from comparative ethylene polymers.

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

The following examples are presented for the purpose of illustrating selected embodiments of this disclosure; it being understood, that the examples presented do not limit the claims presented.

EXAMPLES

Test Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Polyethylene product densities were determined using ASTM D792-13 (Nov. 1, 2013).

Polyethylene product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log $(I_6/I_2)$/log(6480/2160); wherein 16 and 12 are the melt flow rates measured at 190° C. using 6.48 kg and 2.16 kg loads, respectively.

Polyethylene product molecular weights, $M_n$, $M_w$ and $M_z$, as well the as the polydispersity ($M_w/M_n$), were determined using ASTM D6474-12 (Dec. 15, 2012). This method illuminates the molecular weight distributions of polyethylene polymer products by high temperature gel permeation chromatography (GPC). The method uses commercially available polystyrene standards to calibrate the GPC.

The "Composition Distribution Branching Index" or "CDBI" of the Inventive Examples and Comparative Examples were determined using a crystal-TREF unit commercially available form Polymer ChAR (Valencia, Spain). The acronym "TREF" refers to Temperature Rising Elution Fractionation. A sample of ethylene polymer product (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The polyethylene product was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized polyethylene product was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the polyethylene product was eluted from the TREF column, i.e. a TREF distribution curve is a plot of the quantity (or intensity) of polyethylene product eluting from the column as a function of TREF elution temperature. A $CDBI_{50}$ was calculated from the TREF distribution curve for each polyethylene product analyzed. The "$CDBI_{50}$" is defined as the weight percent of ethylene polymer whose composition is within 50% of the median comonomer composition (50% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the polyethylene product fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. The "$CDBI_{25}$" is defined as the weight percent of polyethylene product whose composition is within 25% of the median comonomer composition (25% on each side of the median comonomer composition).

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity ($\eta^*$) were obtained as a function of frequency. The same rheological data can also be obtained by using a 25 mm diameter parallel plate geometry at 190° C. under nitrogen atmosphere.

Film dart impact strength was determined using ASTM D1709-09 Method A (May 1, 2009). In this disclosure the dart impact test employed a 1.5 inch (38 mm) diameter hemispherical headed dart.

Film "puncture", or "slow puncture" is the energy (J/mm) required to break the film was determined using ASTM D5748-95 (originally adopted in 1995, reapproved in 2012).

The "lubricated puncture" test was performed as follows: the energy (J/mm) to puncture a film sample was determined using a 0.75-inch (1.9-cm) diameter pear-shaped fluorocarbon coated probe travelling at 10-inch per minute (25.4-cm/minute).

ASTM conditions were employed. Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R[8] Canada. The probe was mounted in an Instron Model 5 SL Universal Testing Machine and a 1000-N load cell as used. Film samples (1.0 mil (25 µm) thick, 5.5 inch (14 cm) wide and 6 inch (15 cm) long) were mounted in the Instron and punctured.

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/in³). Tensile properties were measured in the both the machine direction (MD) and the transverse direction (TD) of the blown films.

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film tear performance was determined by ASTM D1922-09 (May 1, 2009); an equivalent term for tear is "Elmendorf tear". Film tear was measured in both the machine direction (MD) and the transverse direction (TD) of the blown films.

Film optical properties were measured as follows: Haze, ASTM D1003-13 (Nov. 15, 2013), and; Gloss ASTM D2457-13 (Apr. 1, 2013).

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-µm) thick film), i.e. when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm$^2$; delay time, 0.5 second; film peel speed, 7.9 in/second (200 mm/second); testing temperature range, 203° F. to 293° F. (95° C. to 145° C.); temperature increments, 9° F. (5° C.); and five film samples were tested at each temperature increment to calculate average values at each temperature. The following data was recorded for the Inventive Example films and Comparative Example films: the "Tack Onset @ 1.0 N (° C.)", the temperature at which a hot tack force of 1N was observed (average of 5-film samples); "Max Hot tack Strength (N)", the maximum hot tack force observed (average of 5-film samples) over the testing temperature range, and; "Temperature–Max. Hot tack (° C.)", the temperature at which the maximum hot tack force was observed.

In this disclosure, the "Heat Seal Strength Test" (also known as "the cold seal test") was performed as follows. ASTM conditions were employed. Heat seal data was generated using a conventional Instron Tensile Tester. In this test, two film samples are sealed over a range of temperatures (the two film samples were cut from the same roll of 2.0 mil (51-µm) thick film). The following parameters were used in the Heat Seal Strength (or cold seal) Test: film specimen width, 1 inch (25.4 mm); film sealing time, 0.5 second; film sealing pressure, 40 psi (0.28 N/mm$^2$); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereafter S.I.T., is defined as the temperature required to form a commercially viable seal; a commercially viable seal has a seal strength of 2.0 lb per inch of seal (8.8 N per 25.4 mm of seal).

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 µm) monolayer film was placed in a stainless steel basket, the film and basket were weighed ($w^i$), while in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractables ($w^{C6}$): $w^{C6}=100\times(w^i-w^f)/w^i$.

Polymerization

Embodiments of the polyethylene products were prepared in a pilot plant using two CSTR reactors configured in parallel (reactors 1 and 2), followed by a tubular reactor (reactor 3) as represented by the continuous solution polymerization process shown in FIG. 1. In the inventive examples, ethylene was fed to reactor 3. Comparative polyethylene products were prepared similarly and according to the continuous solution polymerization process shown in FIG. 1, expect for that fact that ethylene was not fed to reactor 3.

Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 0.58 gallons (2.2 L) or 4.8 gallons (18 L). The R1 pressure was from about 14 MPa to about 18 MPa; the R2 pressure was from about 14 MPa to about 18 MPa. Reactor 3 was operated at a lower pressure to facilitate continuous flow from reactors 1 and 2 toward reactor 3. R1 and R2 were configured in parallel to each other, and the combined exit streams from reactor 1 and 2, streams 1' and 2' respectively were fed to reactor 3. Both CSTR's were agitated to give conditions in which the reactor contents were well mixed. The process was operated continuously by feeding fresh process solvent, ethylene, 1-octene and hydrogen to the reactors, as described under the reactor conditions given in Table 1.

The single site catalyst system components were fed to both of reactors 1 and 2 and included: component (a), cyclopentadienyl tri(tertiary butyl)phosphinimine titanium dichloride, $Cp((t-Bu)_3PN)TiCl_2$; component (b), modified methylaluminoxane (MMAO-07); component (c), trityl tetrakis(pentafluoro-phenyl)borate, and; component (d), 2,6-di-tert-butyl-4-ethylphenol.

The single site catalyst system component solvents used were methylpentane for catalyst components (b) and (d) and xylene for catalyst components (a) and (c).

The average residence time of the solvent in a reactor was primarily influenced by the amount of solvent flowing through each reactor and the total amount of solvent flowing through the solution process. The following are representative values for the examples shown in Table 1: average reactor residence times were: about 8.2 seconds in R1, about 36 seconds in R2, about 6 seconds for an R3 volume of 0.58 gallons (2.2 L), and about 65 seconds for an R3 volume of 4.8 gallons (18 L). Hence, if the polymerization reaction was left to proceed in reactor 3 for a relatively short period of time, then a catalyst deactivator was added to reactor 3 at a point at which about 2.2 L of volume of the reactor was utilized for polymerization (Comparative Example 1); alternatively, if the polymerization reaction was left to proceed in reactor 3 for a relatively long period of time, then a catalyst deactivator was added to reactor 3 to terminate the reaction near the exit of the tubular reactor (R3), at a point at which about 18 L of volume of the reactor was utilized for polymerization (Comparative Example 2, and Inventive Examples 1-5). For the Inventive Examples, ethylene monomer was fed to the third reactor at a point at which about 2.2 L of volume of the reactor was utilized for polymerization (Inventive Examples 1-5). For the Comparative Examples 1 and 2, no ethylene monomer was fed to the third reactor.

The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all examples.

A two-stage devolitizing process was employed to recover the final polyethylene product from the process solvent, i.e. two vapor/liquid separators were used and the second bottom stream (from the second V/L separator) was passed through a gear pump/pelletizer combination.

Prior to pelletization the polyethylene product was stabilized by adding 500 ppm of Irganox 1076 (a primary antioxidant) and 500 ppm of Irgafos 168 (a secondary antioxidant), based on weight of the polyethylene polymer product.

Antioxidants were dissolved in process solvent and added between the first and second V/L separators.

Catalyst system details, reactor conditions and some final polyethylene product properties are given in Table 1. Table 1 also discloses process parameters such as ethylene and comonomer (i.e. 1-octene) splits ("ES" and "CS") between the reactors, ethylene concentrations in each reactor, ethylene conversions ("Q") in each reactor, etc. When carrying out the polymerization process for each of the examples in Table 1 the targeted polyethylene product was one having a melt index($I_2$) (ASTM D1239, 2.16 kg load, 190° C.) or 1 g/10 min and a density of 0.917 g/cm³ (ASTM D792).

TABLE 1

| Example No. | Comp. 1 | Comp. 2 | Inv. 1 | Inv. 2 |
|---|---|---|---|---|
| Total solution rate (kg/h) | 500.0 | 500.0 | 515.7 | 525.3 |
| $EC^{R1}$ (R1 ethylene concentration (wt %)) | 8.3 | 8.1 | 8.0 | 8.2 |
| $EC^{R2}$ (R2 ethylene concentration (wt %)) | 13.0 | 11.9 | 11.5 | 11.96 |
| $EC^{R3}$ (R3 ethylene concentration (wt %)) | 9.1 | 8.8 | 9.5 | 9.76 |
| $ES^{R1}$ (%) | 70.00 | 70.00 | 63.0 | 63.0 |
| $ES^{R2}$ (%) | 30.00 | 30.00 | 27.0 | 27.0 |
| $ES^{R3}$ (%) | 0.0 | 0.0 | 10.0 | 10.0 |
| Comonomer | 1-octene | 1-octene | 1-octene | 1-octene |
| ((1-octene)/(ethylene))$^{R1}$ (wt %) | 0.817 | 0.850 | 0.824 | 0.731 |
| $CS^{R1}$ (%) | 100.0 | 100.0 | 100.0 | 100.0 |
| $CS^{R2}$ (%) | 0 | 0 | 0 | 0.0 |
| $CS^{R3}$ (%) | 0 | 0 | 0 | 0.0 |
| R1 inlet temp (° C.) | 35.0 | 35.0 | 35.0 | 30.0 |
| R2 inlet temp (° C.) | 54.9 | 54.9 | 54.9 | 44.7 |
| R3 Fresh Feed Temperature (° C.) | 130.1 | 129.2 | 129.7 | 130.1 |
| $Q^{R1}$ (%) | 89.0 | 89.0 | 89.0 | 89.0 |
| $Q^{R2}$ (%) | 96.2 | 96.0 | 96.8 | 96.0 |
| $Q^{R3}$ (%) | 27.26 | 66.6 | 78.4 | 82.2 |
| $Q^{TOTAL}$ (%) | 93.4 | 96.9 | 96.0 | 92.7 |
| R1 Mean temp (° C.) | 138.3 | 135.8 | 135.0 | 133.2 |
| R2 Mean temp (° C.) | 195.4 | 195.0 | 189.9 | 189.8 |
| $H_2^{R1}$ (ppm) | 0.40 | 0.20 | 0.20 | 0.20 |
| $H_2^{R2}$ (ppm) | 0.47 | 0.42 | 0.44 | 0.10 |
| $H_2^{R3}$ (ppm) | 0.0 | 0.0 | 0.50 | 0.52 |
| R1 Agitator speed (rpm) | 690.0 | 690.0 | 900.0 | 800.0 |
| R2 Agitator speed (rpm) | 690.0 | 690.0 | 690.0 | 690.0 |
| Reactor 1 Pressure | 16.0 | 16.0 | 16.0 | 16.0 |
| R1 (a) (ppm) | 0.26 | 0.29 | 0.26 | 0.34 |
| R1 (b)/(a) mole ratio | 65 | 65 | 65 | 65 |
| R1 (d)/(b) mole ratio | 0.30 | 0.30 | 0.30 | 0.30 |
| R1 (c)/(a) mole ratio | 1.20 | 1.20 | 1.20 | 1.20 |
| R1 Diluent Temperature | 29.9 | 29.9 | 30.0 | 15.3 |
| R2 (a) (ppm) | 0.27 | 0.41 | 0.26 | 0.98 |
| R2 (b)/(a) mole ratio | 65 | 65 | 65 | 65 |
| R2 (d)/(b) mole ratio | 0.30 | 0.30 | 0.30 | 0.30 |
| R2 (c)/(a) mole ratio | 1.50 | 1.50 | 1.50 | 1.50 |
| R2 Diluent Temperature | 40.28 | 41.63 | 41.69 | 30.3 |
| R3 inlet temp (actual) (° C.) | 158.0 | 156.9 | 154.5 | 153.5 |
| R3 outlet temp (actual) (° C.) | 172.9 | 175.4 | 180.0 | 180.7 |

TABLE 1-continued

| | | | | |
|---|---|---|---|---|
| Heat exchanger outlet temperature (° C.) | 226.7 | 227.2 | 229.7 | 226.6 |
| Delta T (the difference between T(outlet) Heat Exchanger and T(outlet) of Reactor 3 | 54 | 52 | 50 | 46 |
| Reduction in IPS feed heater delta T (%) | 0 | 4 | 8 | 15 |
| Prod. Rate (kg/h) | 49.5 | 50.1 | 55.1 | 57.5 |
| Polyethylene Properties | | | | |
| Density (g/cm$^3$) | 0.9193 | 0.9179 | 0.9174 | 0.9176 |
| Melt Index $I_2$ (g/10 min) | 0.99 | 0.96 | 0.97 | 0.94 |
| Melt Flow Ratio ($I_{21}/I_2$) | 20.1 | 21 | 21.2 | 21.9 |
| Stress Exponent | 1.18 | 1.19 | 1.2 | 1.22 |
| Branch Freq/1000 C. | 12.1 | 13.7 | 13.9 | 14.3 |
| $M_n$ | 42056 | 41461 | 44652 | 34817 |
| $M_w$ | 99753 | 101177 | 103913 | 97619 |
| $M_z$ | 185845 | 184183 | 193461 | 185579 |
| Polydispersity Index ($M_w/M_n$) | 2.37 | 2.44 | 2.33 | 2.8 |

| Example No. | Inv. 3 | Inv. 4 | Inv. 5 |
|---|---|---|---|
| Total solution rate (kg/h) | 525.0 | 525.0 | 525.0 |
| $EC^{R1}$ (R1 ethylene concentration (wt %)) | 7.9 | 8.1 | 7.6 |
| $EC^{R2}$ (R2 ethylene concentration (wt %)) | 11.4 | 8.95 | 12.7 |
| $EC^{R3}$ (R3 ethylene concentration (wt %)) | 10.3 | 10.52 | 11.4 |
| $ES^{R1}$ (%) | 55.9 | 56.0 | 45.0 |
| $ES^{R2}$ (%) | 24.1 | 24.0 | 25.0 |
| $ES^{R3}$ (%) | 20.0 | 20.0 | 30.0 |
| Comonomer | 1-octene | 1-octene | 1-octene |
| ((1-octene)/(ethylene))$^{R1}$ (wt %) | 0.800 | 0.750 | 0.760 |
| $CS^{R1}$ (%) | 100.0 | 100.0 | 100.0 |
| $CS^{R2}$ (%) | 0 | 0.0 | 0 |
| $CS^{R3}$ (%) | 0 | 0.0 | 0 |
| R1 inlet temp (° C.) | 35.0 | 30.0 | 30.0 |
| R2 inlet temp (° C.) | 54.9 | 44.7 | 40.2 |
| R3 Fresh Feed Temperature (° C.) | 129.7 | 129.8 | 130.1 |
| $Q^{R1}$ (%) | 89.0 | 89.1 | 89.0 |
| $Q^{R2}$ (%) | 96.4 | 96.0 | 86.2 |
| $Q^{R3}$ (%) | 83.8 | 81.3 | 82.4 |
| $Q^{TOTAL}$ (%) | 95.6 | 89.6 | 94.0 |
| R1 Mean temp (° C.) | 134.3 | 131.1 | 127.3 |
| R2 Mean temp (° C.) | 190.2 | 190.8 | 195.2 |
| $H_2^{R1}$ (ppm) | 0.20 | 0.20 | 0.20 |
| $H_2^{R2}$ (ppm) | 0.48 | 0.10 | 0.10 |
| $H_2^{R3}$ (ppm) | 0.50 | 0.62 | 0.63 |
| R1 Agitator speed (rpm) | 690.0 | 800.0 | 690.0 |
| R2 Agitator speed (rpm) | 690.0 | 690.0 | 690.0 |
| Reactor 1 Pressure | 16.0 | 16.0 | 16.0 |
| R1 (a) (ppm) | 0.31 | 0.32 | 0.30 |
| R1 (b)/(a) mole ratio | 65 | 65 | 65 |
| R1 (d)/(b) mole ratio | 0.30 | 0.30 | 0.30 |
| R1 (c)/(a) mole ratio | 1.20 | 1.20 | 1.20 |
| R1 Diluent Temperature | 29.9 | 26.1 | 18.8 |
| R2 (a) (ppm) | 0.27 | 1.04 | 0.52 |
| R2 (b)/(a) mole ratio | 65 | 65 | 65 |
| R2 (d)/(b) mole ratio | 0.30 | 0.30 | 0.30 |
| R2 (c)/(a) mole ratio | 1.50 | 1.50 | 1.50 |
| R2 Diluent Temperature | 39.12 | 48.0 | 43.17 |
| R3 inlet temp (actual) (° C.) | 154.2 | 151.6 | 149.6 |
| R3 outlet temp (actual) (° C.) | 188.2 | 186.2 | 193.7 |
| Heat exchanger outlet temperature (° C.) | 233.5 | 230.2 | 237.2 |
| Delta T (the difference between T(outlet) Heat Exchanger and T(outlet) of Reactor 3 | 45 | 44 | 44 |
| Reduction in IPS feed heater delta T (%) | 16 | 18 | 19 |
| Prod. Rate (kg/h) | 60.7 | 61.1 | 66.3 |

TABLE 1-continued

Polyethylene Properties

| | | | |
|---|---|---|---|
| Density (g/cm³) | 0.9175 | 0.917 | 0.9163 |
| Melt Index I₂ (g/10min) | 1.14 | 1.03 | 0.97 |
| Melt Flow Ratio (I₂₁/I₂) | 21.6 | 22 | 24 |
| Stress Exponent | 1.2 | 1.22 | 1.24 |
| Branch Freq/1000 C. | 14.3 | 14.8 | 15.1 |
| $M_n$ | 39596 | 42795 | 37386 |
| $M_w$ | 98041 | 100485 | 104311 |
| $M_z$ | 184559 | 194174 | 232013 |
| Polydispersity Index ($M_w/M_n$) | 2.48 | 2.35 | 2.79 |

As can be seen in the data provided in Table 1, in each of the Inventive examples, where fresh ethylene is fed directly to reactor 3, the productivity (kg of polyethylene product per hour) of the polymerization reaction improved relative to either of the Comparative Examples, in which no fresh ethylene was fed to reactor 3. The productivity generally increased as the amount of ethylene fed to reactor 3 increased.

Also, and importantly, the Inventive Examples show that as the reactor 3 ethylene split $ES^{R3}$ increased so did the temperature of the reactor 3 effluent stream (the "R3 exit temperature"), which in turn reduced the energy burden on the downstream heat exchanger. Or put another way, since the reactor 3 exit temperature had increased, less heat must be added by way of the heat exchanger prior to feeding the final polyethylene product stream to the solvent separation system (i.e. the devolatilization system) in order to carry out efficient separation. This is further evidenced by the decrease in the temperature difference between the reactor 3 outlet temperature and the heat exchanger outlet temperature as well as the corresponding relative percent decrease in the temperature difference of the same relative to Comparative Example 1 (see Table 1).

As a high heat exchanger outlet temperature is desired for efficient solvent/polymer separation, the present Inventive Examples, provide improvements in energy consumption by increasing the temperature of the reactor 3 exit stream relative to the Comparative Examples. These improvements reduce energy inputs, improve cost, and lower environmental impacts.

Polyethylene product composition properties are provided in Table 2. Details of the polyethylene product composition components, the first, second and third polyethylene, were calculated using Copolymerization Reactor modelling in substantially the same manner as described in U.S. Pat. No. 9,074,082 except that the model was adapted to the use of three reactors instead of two. The results of this modelling are provided in Table 3.

TABLE 2

| Example No. | Comp. 1 | Comp. 2 | Inv. 1 | Inv. 2 |
|---|---|---|---|---|
| Density (g/cm³) | 0.9193 | 0.9179 | 0.9174 | 0.9176 |
| Melt Index I₂ (g/10 min) | 0.99 | 0.96 | 0.97 | 0.94 |
| Melt Index I₆ (g/10 min) | 3.62 | 3.54 | 3.6 | 3.58 |
| Melt Index I₁₀ (g/10 min) | 6.16 | 6.24 | 6.31 | 6.28 |
| Melt Index I₂₁ (g/10 min) | 19.8 | 20.1 | 20.6 | 20.7 |
| Melt Flow Ratio (I₂₁/I₂) | 20.1 | 21 | 21.2 | 21.9 |
| Stress Exponent | 1.18 | 1.19 | 1.2 | 1.22 |
| Melt Flow Ratio (I₁₀/I₂) | 6.36 | 6.52 | 6.64 | 6.74 |
| Rheological Properties | | | | |
| Zero Shear Viscosity - 190° C. (Pa-s) | 8057 | 8453 | 8405 | 9356 |
| Crossover Frequency - 190° C. (rad/s) | 134.88 | 106.94 | 113.81 | 112.04 |
| DRI | 0.13 | 0.14 | 0.13 | 0.19 |
| G'@G" 500 Pa = | 19.1 | 19.8 | 18.4 | 25.8 |
| Branch Frequency - FTIR | | | | |
| Branch Freq/1000 C. | 12.1 | 13.7 | 13.9 | 14.3 |
| Comonomer | 1-octene | 1-octene | 1-octene | 1-octene |
| Comonomer Content (mole %) | 2.4 | 2.7 | 2.8 | 2.9 |
| Comonomer Content (wt %) | 9.1 | 10.1 | 10.3 | 10.5 |
| Internal Unsat/100 C. | 0.02 | 0.023 | 0.02 | 0.02 |
| Side Chain Unsat/100 C. | 0 | 0 | 0.001 | 0 |
| Terminal Unsat/100 C. | 0.006 | 0.008 | 0.006 | 0.005 |
| CTREF | | | | |
| First Elution Peak (° C.) | 94.9 | 94.9 | 95.5 | 95.4 |
| Second Elution Peak (° C.) | 75.6 | 74.6 | 72.8 | 72.1 |
| Third Elution Peak (° C.) | — | — | — | — |
| Highest eluting peak temp. - Lowest eluting peak temp. (° C.) | 19.3 | 20.3 | 22.7 | 23.3 |
| CDBI ₂₅ | 49.8 | 50.2 | 52 | 47.6 |
| CDBI ₅₀ | 62.6 | 62 | 63 | 61.7 |
| wt. % of polyethylene eluting at from 25° C. to 60° C. | 4.6 | 7.2 | 7.4 | 8.6 |
| wt. % of polyethylene eluting at from 65° C. to 75° C. | 39.9 | 46.3 | 55.3 | 53.3 |
| wt. % of polyethylene eluting at from 75° C. to 90° C. | 30.4 | 22.1 | 12.5 | 13.4 |

TABLE 2-continued

| | | | | |
|---|---|---|---|---|
| wt.% of polyethylene eluting at from 90° C. to 105° C. | 25.1 | 24.4 | 24.8 | 24.7 |
| DSC | | | | |
| First Melting Peak (° C.) | 102.36 | 101.69 | 100.18 | 99.93 |
| Second Melting Peak (° C.) | 121.13 | 120.86 | 121.1 | 121 |
| Third Melting Peak (° C.) | 124.34 | 124.36 | 124.85 | 124.78 |
| Heat of Fusion (J/g) | 132.03 | 127.31 | 125.53 | 129.12 |
| Crystallinity (%) | 45.53 | 43.90 | 43.28 | 44.52 |
| GPC - Conventional | | | | |
| $M_n$ | 42056 | 41461 | 44652 | 34817 |
| $M_w$ | 99753 | 101177 | 103913 | 97619 |
| $M_z$ | 185845 | 184183 | 193461 | 185579 |
| Polydispersity Index ($M_w/M_n$) | 2.37 | 2.44 | 2.33 | 2.8 |
| Mz/Mw | 1.86 | 1.82 | 1.86 | 1.90 |
| Hexane Extractables (%) - Plaque | 0.21 | 0.79 | 0.55 | 0.55 |

| Example No. | Inv. 3 | Inv. 4 | Inv. 5 |
|---|---|---|---|
| Density (g/cm³) | 0.9175 | 0.917 | 0.9163 |
| Melt Index $I_2$ (g/10 min) | 1.14 | 1.03 | 0.97 |
| Melt Index $I_6$ (g/10 min) | 4.26 | 3.9 | 3.76 |
| Melt Index $I_{10}$ (g/10 min) | 7.36 | 6.58 | 6.73 |
| Melt Index $I_{21}$ (g/10 min) | 24.5 | 22.6 | 23.2 |
| Melt Flow Ratio ($I_{21}/I_2$) | 21.6 | 22 | 24 |
| Stress Exponent | 1.2 | 1.22 | 1.24 |
| Melt Flow Ratio ($I_{10}/I_2$) | 6.64 | 6.8 | 7.08 |
| Rheological Properties | | | |
| Zero Shear Viscosity - 190° C. (Pa-s) | 7443 | 9231 | 9359 |
| Crossover Frequency - 190° C. (rad/s) | 141.02 | 121.46 | 103.74 |
| DRI | 0.17 | 0.24 | 0.26 |
| G'@G" 500 Pa = | 21.3 | 32.4 | 30.3 |
| Branch Frequency - FTIR | | | |
| Branch Freq/1000 C. | 14.3 | 14.8 | 15.1 |
| Comonomer ID | 1-octene | 1-octene | 1-octene |
| Comonomer Content (mole %) | 2.9 | 3 | 3 |
| Comonomer Content (wt %) | 10.5 | 10.9 | 11.1 |
| Internal Unsat/100 C. | 0.021 | 0.021 | 0.023 |
| Side Chain Unsat/100 C. | 0.001 | 0.001 | 0.002 |
| Terminal Unsat/100 C. | 0.007 | 0.005 | 0.007 |
| CTREF | | | |
| First Elution Peak (° C.) | 95.4 | 95.3 | 95.2 |
| Second Elution Peak (° C.) | 83.3 | 84.4 | 86.4 |
| Third Elution Peak (° C.) | 70.6 | 69.6 | 63.4 |
| Highest eluting peak temp. - Lowest eluting peak temp. (° C.) | 24.8 | 25.7 | 31.8 |
| $CDBI_{25}$ | 44 | 43.3 | 23.4 |
| $CDBI_{50}$ | 61.8 | 60.3 | 46.7 |
| wt. % of polyethylene eluting at from 25° C. to 60° C. | 9.2 | 10.4 | 19.3 |
| wt. % of polyethylene eluting at from 65° C. to 75° C. | 52.4 | 52.2 | 35 |
| wt. % of polyethylene eluting at from 75° C. to 90° C. | 14.6 | 13.9 | 17.8 |
| wt. % of polyethylene eluting at from 90° C. to 105° C. | 23.8 | 23.5 | 27.9 |
| DSC | | | |
| First Melting Peak (° C.) | 100.12 | 98.5 | 95.33 |
| Second Melting Peak (° C.) | 121.4 | 121 | 121.92 |
| Third Melting Peak (° C.) | 125.8 | 124.6 | 124.7 |
| Heat of Fusion (J/g) | 118.66 | 128.7 | 133.49 |
| Crystallinity (%) | 40.91 | 44.40 | 46.03 |
| GPC - Conventional | | | |
| $M_n$ | 39596 | 42795 | 37386 |
| $M_w$ | 98041 | 100485 | 104311 |
| $M_z$ | 184559 | 194174 | 232013 |
| Polydispersity Index ($M_w/M_n$) | 2.48 | 2.35 | 2.79 |
| Mz/Mw | 1.88 | 1.93 | 2.22 |
| Hexane Extractables (%) - Plaque | 0.56 | 0.57 | 0.57 |

TABLE 3

| Example No. | Comp. 1 | Comp. 2 | Inv. 1 | Inv. 2 |
|---|---|---|---|---|
| Density (g/cm³) | 0.9193 | 0.9179 | 0.9174 | 0.9176 |
| $I_2$ (g/10 min.) | 0.99 | 0.96 | 0.97 | 0.94 |
| S.Ex. | 1.18 | 1.19 | 1.2 | 1.22 |
| MFR ($I_{21}/I_2$) | 20.1 | 21 | 21.2 | 21.9 |
| Mn | 42056 | 41461 | 44652 | 34817 |
| Mw | 99753 | 101177 | 103913 | 97619 |
| Mz | 185845 | 184183 | 193461 | 185579 |
| Mw/Mn | 2.37 | 2.44 | 2.33 | 2.80 |
| Mz/Mw | 1.86 | 1.82 | 1.86 | 1.90 |
| First Polyethylene (R1) | | | | |
| weight fraction, w1 | 0.708 | 0.677 | 0.616 | 0.613 |
| Mn1 | 59506 | 63213 | 63490 | 67033 |
| Mw1 | 119013 | 126427 | 126981 | 134066 |
| Mw/Mn1 | 2.00 | 2.00 | 2.00 | 2.00 |
| short chain branches per 1000 carbons | 16 | 16 | 18 | 16 |
| $I_2^1$ (g/10 min.) | 0.51 | 0.4 | 0.4 | 0.32 |
| d1 (g/cm³) | 0.9032 | 0.9016 | 0.8995 | 0.9022 |
| Second Polyethylene (R2) | | | | |
| weight fraction, w2 | 0.277 | 0.264 | 0.239 | 0.241 |
| Mn2 | 28833 | 28821 | 28718 | 28713 |
| Mw2 | 57667 | 57642 | 57437 | 57426 |

TABLE 3-continued

| | | | | |
|---|---|---|---|---|
| Mw/Mn2 | 2.00 | 2.00 | 2.00 | 2.00 |
| short chain branches per 1000 carbons | 0 | 0 | 0 | 0 |
| $I_2^2$ (g/10 min) | 7.56 | 7.58 | 7.7 | 7.71 |
| d2 (g/cm$^3$) | 0.9559 | 0.9559 | 0.9559 | 0.9559 |
| Third Polyethylene (R3) | | | | |
| weight fraction, w3 | 0.016 | 0.059 | 0.145 | 0.146 |
| Mn3 | 12074 | 5520 | 12696 | 14050 |
| Mw3 | 24299 | 15044 | 44683 | 50887 |
| Mw/Mn3 | 2.01 | 2.73 | 3.52 | 3.62 |
| short chain branches per 1000 carbons | 30 | 47 | 26 | 24 |
| $I_2^3$ (g/10 min) | 221 | 1566 | 23.4 | 14.2 |
| d3 (g/cm$^3$) | 0.8982 | 0.8815 | 0.9033 | 0.9057 |
| (R2 Mw2 - R1 Mw1)/R2 Mw2 | −106.4% | −119.3% | −121.1% | −133.5% |
| (R3 Mw3 - R2 Mw2)/R3 Mw3 | −137.3% | −283.2% | −28.5% | −12.9% |
| (R3 Mw3 - R1 Mw1)/R3 Mw3 | −389.8% | −740.4% | −184.2% | −163.5% |

| Example No. | Inv. 3 | Inv. 4 | Inv. 5 |
|---|---|---|---|
| Density (g/cm$^3$) | 0.9175 | 0.917 | 0.9163 |
| I2 (g/10 min.) | 1.14 | 1.03 | 0.97 |
| S.Ex. | 1.2 | 1.22 | 1.24 |
| MFR ($I_{21}/I_2$) | 21.6 | 22 | 24 |
| Mn | 39596 | 42795 | 37386 |
| Mw | 98041 | 100485 | 104311 |
| Mz | 194559 | 194174 | 232013 |
| Mw/Mn | 2.48 | 2.35 | 2.79 |
| Mz/Mw | 1.98 | 1.93 | 2.22 |
| First Polyethylene (R1) | | | |
| weight fraction, w1 | 0.558 | 0.555 | 0.467 |
| Mn1 | 59688 | 61496 | 56384 |
| Mw1 | 119376 | 122990 | 112769 |
| Mw/Mn1 | 2.00 | 2.00 | 2.00 |
| short chain branches per 1000 carbons | 19 | 18 | 22 |
| $I_2^1$ (g/10 min.) | 0.5 | 0.44 | 0.61 |
| d1 (g/cm$^3$) | 0.8976 | 0.8991 | 0.8929 |
| Second Polyethylene (R2) | | | |
| weight fraction, w2 | 0.214 | 0.214 | 0.226 |
| Mn2 | 31966 | 31958 | 28829 |
| Mw2 | 63932 | 63917 | 57659 |
| Mw/Mn2 | 2.00 | 2.00 | 2.00 |
| short chain branches per 1000 carbons | 0 | 0 | 0 |
| $I_2^2$ (g/10 min.) | 5.07 | 5.07 | 7.57 |
| d2 (g/cm$^3$) | 0.955 | 0.955 | 0.9559 |
| Third Polyethylene (R3) | | | |
| weight fraction, w3 | 0.228 | 0.231 | 0.307 |
| Mn3 | 19607 | 19642 | 26449 |
| Mw3 | 85474 | 90488 | 122892 |
| Mw/Mn3 | 4.36 | 4.61 | 4.65 |
| short chain branches per 1000 carbons | 17 | 17 | 13 |
| $I_2^3$ (g/10 min.) | 2.25 | 1.55 | 0.53 |
| d3 (g/cm$^3$) | 0.9128 | 0.9132 | 0.9185 |
| (R2 Mw2 - R1 Mw1)/R2 Mw2 | −86.7% | −92.4% | −95.6% |
| (R3 Mw3 - R2 Mw2)/R3 Mw3 | 25.2% | 29.4% | 53.1% |
| (R3 Mw3 - R1 Mw1)/R3 Mw3 | −39.7% | −35.9% | 8.2% |

Figure 4A:
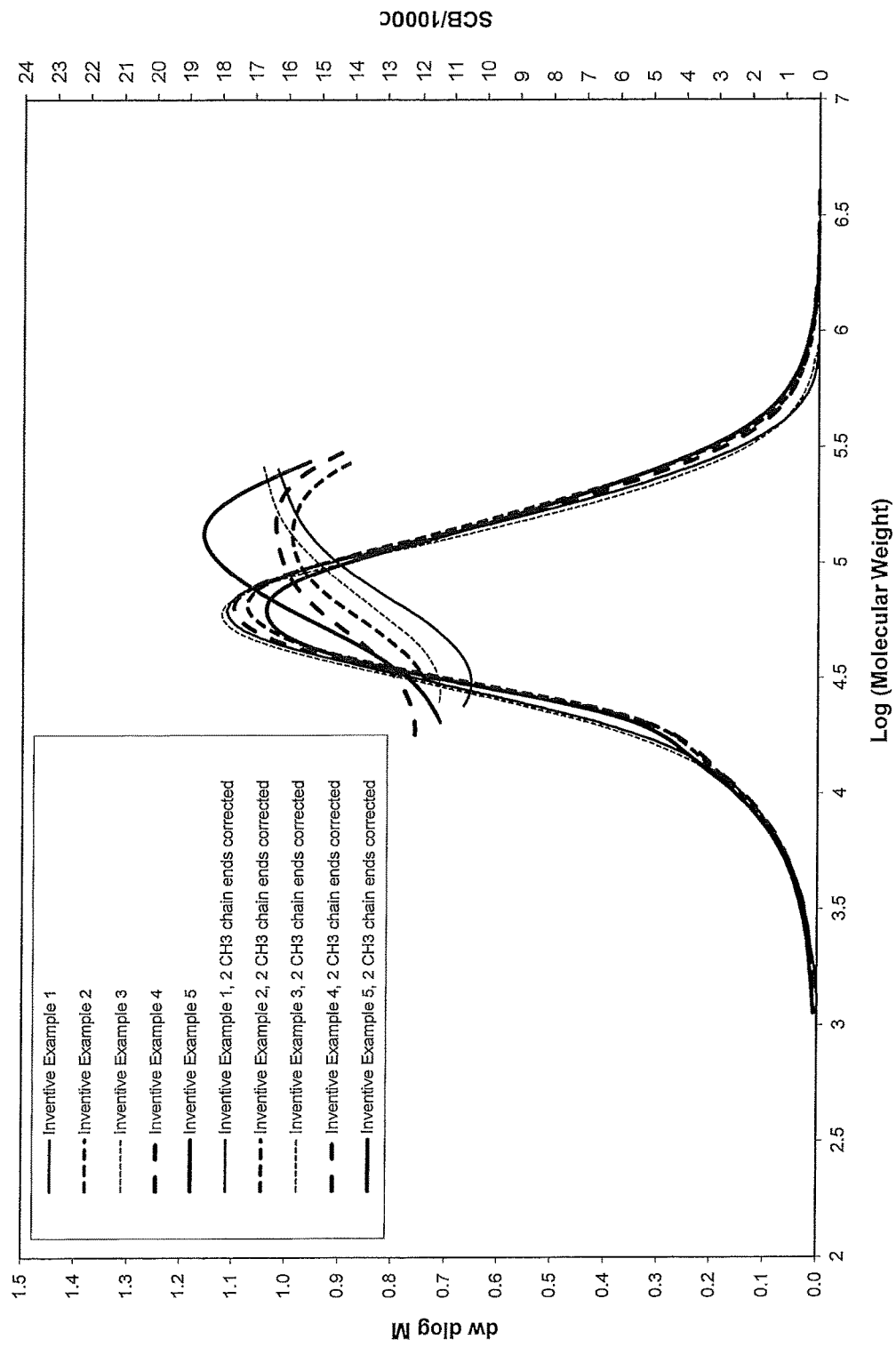
FIG. 4A shows the gel permeation chromatographs with Fourier transform infra-red (GPC-FTIR) detection obtained for polyethylene product compositions made according to the present disclosure. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed" or "partially reversed" with a peak or maximum present for Inventive Examples 2, 4 and 5.
Figure 4B:
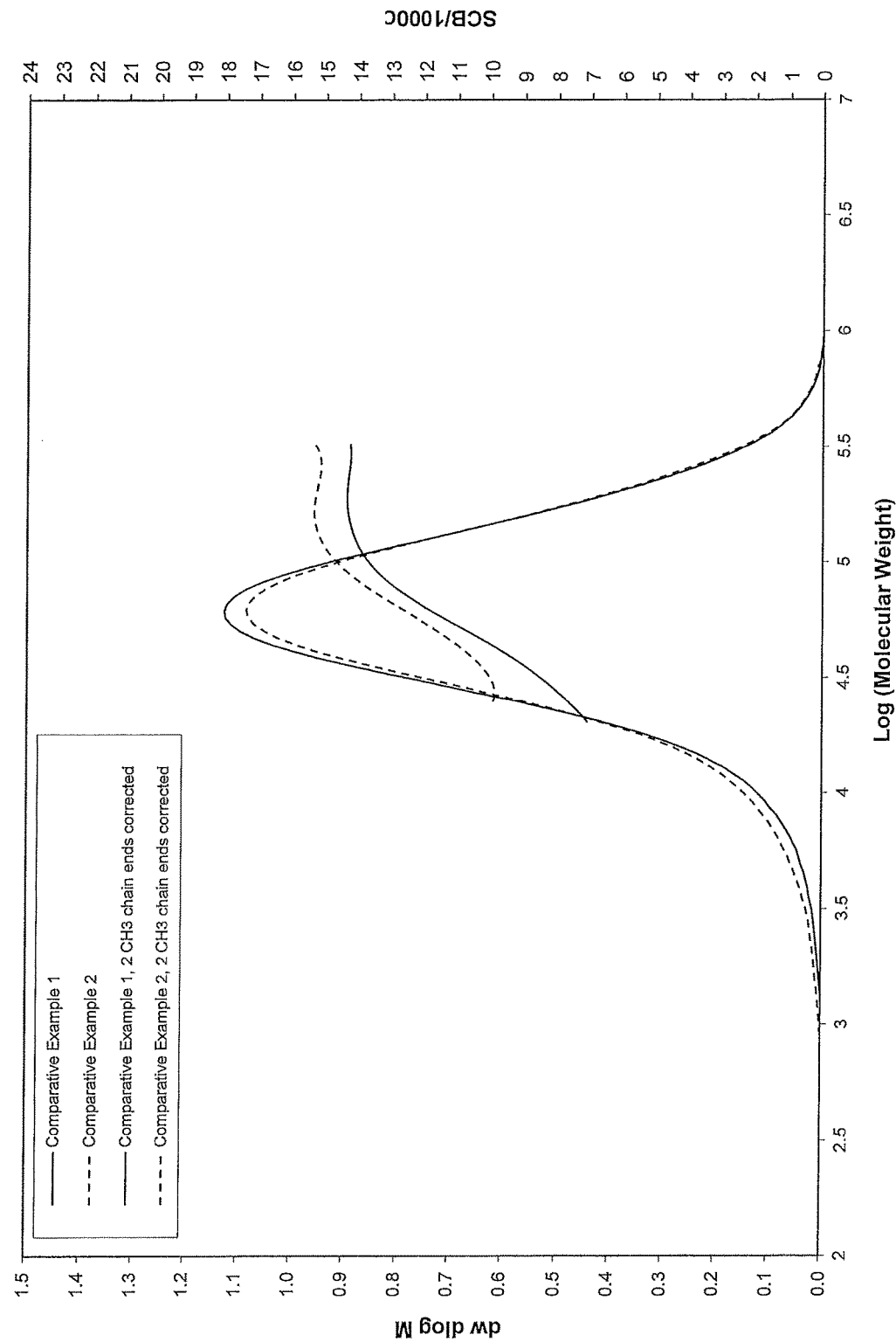
FIG. 4B shows the gel permeation chromatographs with Fourier transform infra-red (GPC-FTIR) detection obtained for comparative polyethylene product compositions.

With reference to FIGS. 4A and 4B, a person skilled in the art will recognize that the inventive polyethylene product compositions have a reverse comonomer incorporation, and indeed that in some cases (inventive examples 2, 4 and 5) the comonomer incorporation is partially reverse (i.e. it first rises as molecular weight increases, and then falls as the molecular weight increases still further).

Figure 5A:
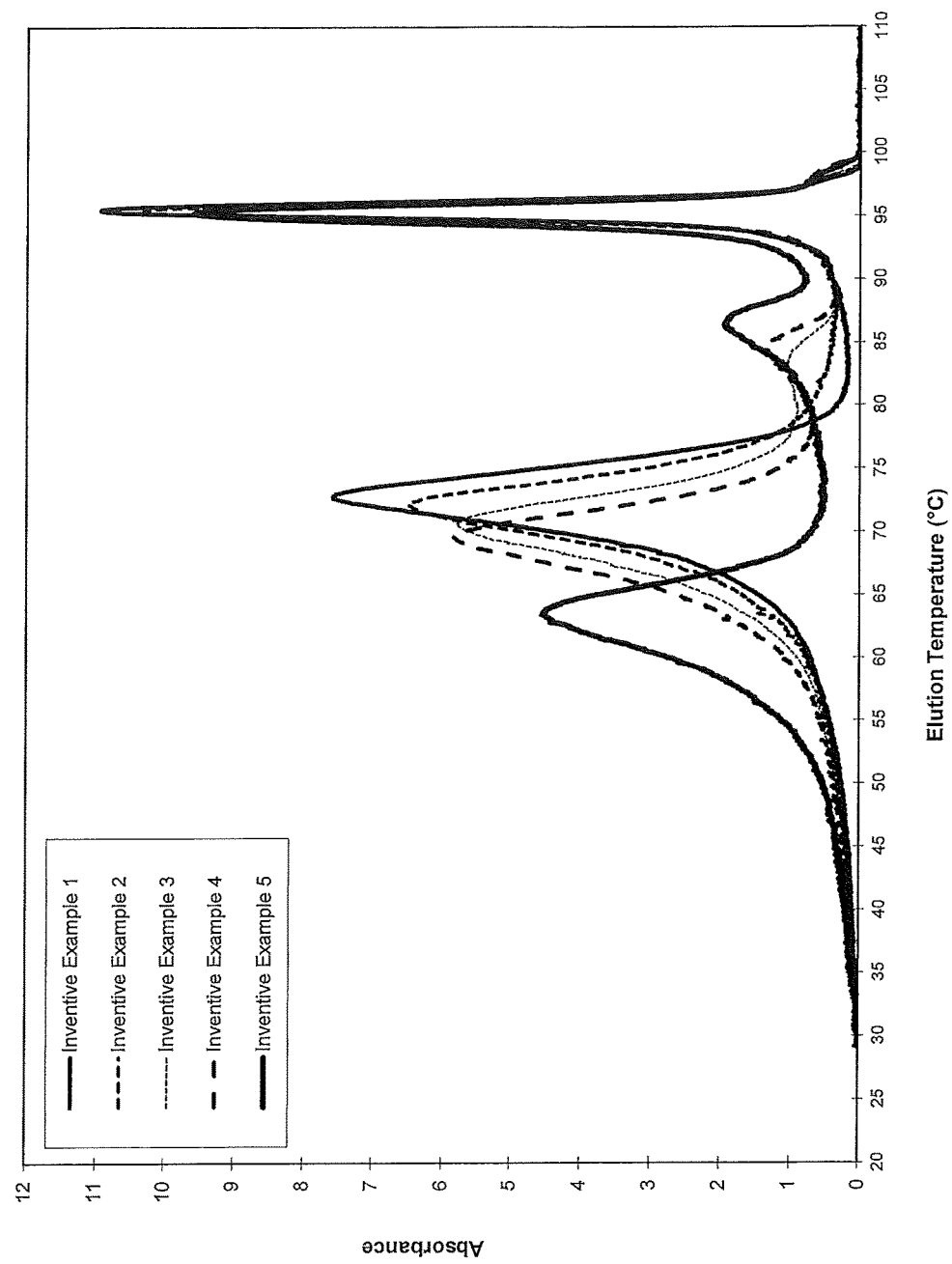
FIG. 5A shows the temperature rising elution fractionation (TREF) analysis and profile of polyethylene product compositions made according to the present disclosure.
Figure 5B:
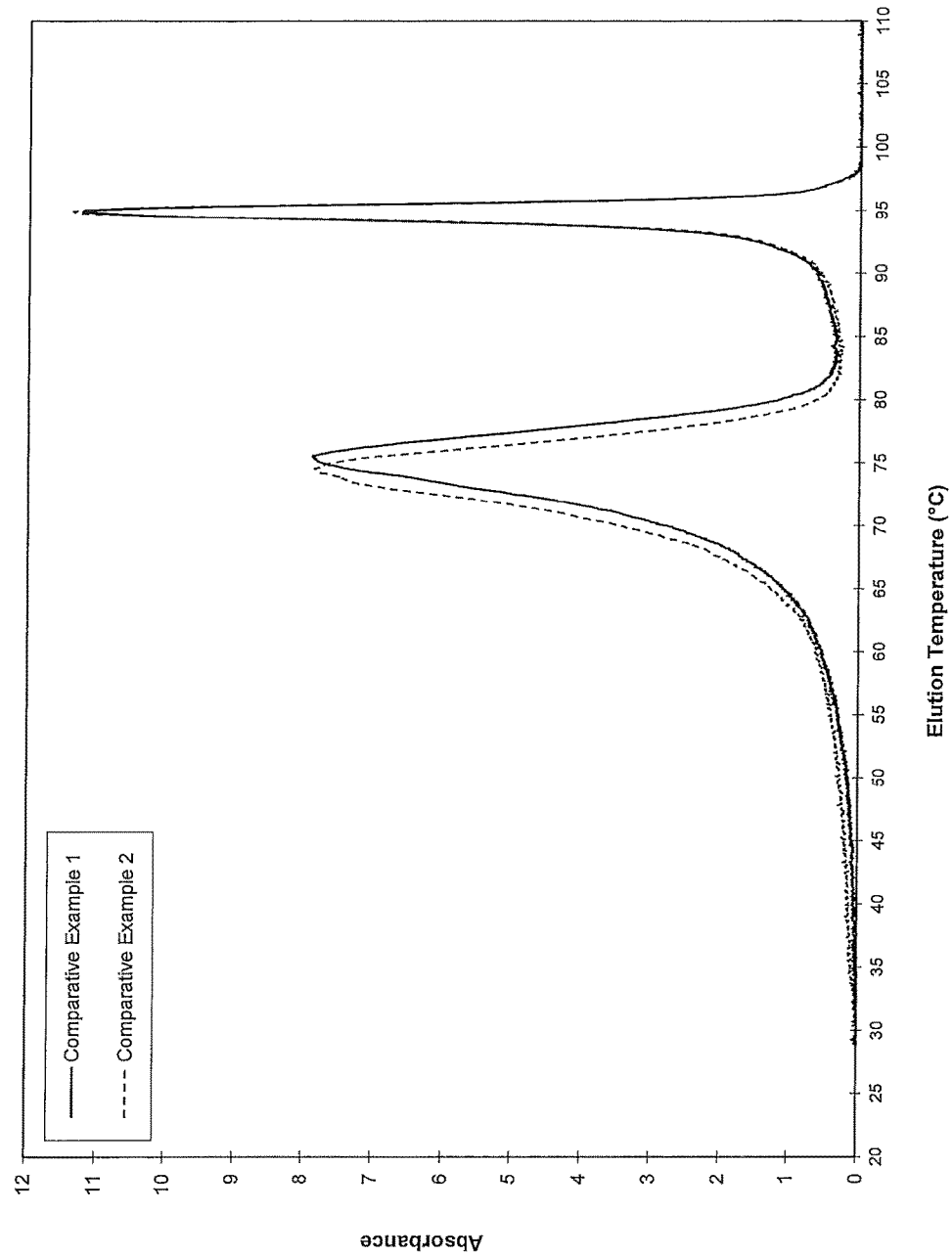
FIG. 5B shows the temperature rising elution fractionation (TREF) analysis and profile of comparative polyethylene product compositions.

With reference to FIGS. 5A and 5B, a person skilled in the art will recognize that the inventive polyethylene product compositions have a multimodal TREF profile. For comparative examples 1 and 2, as well as inventive examples 1 and 2 the TREF profile is bimodal. For inventive examples 3, 4 and 5 the TREF profile is trimodal. In each of the inventive examples 1, 2, 3, 4 and 5, more than 10 weight percent of the polyethylene product composition elutes at a temperature of between about 90° C. and about 100° C.

Figure 6B:
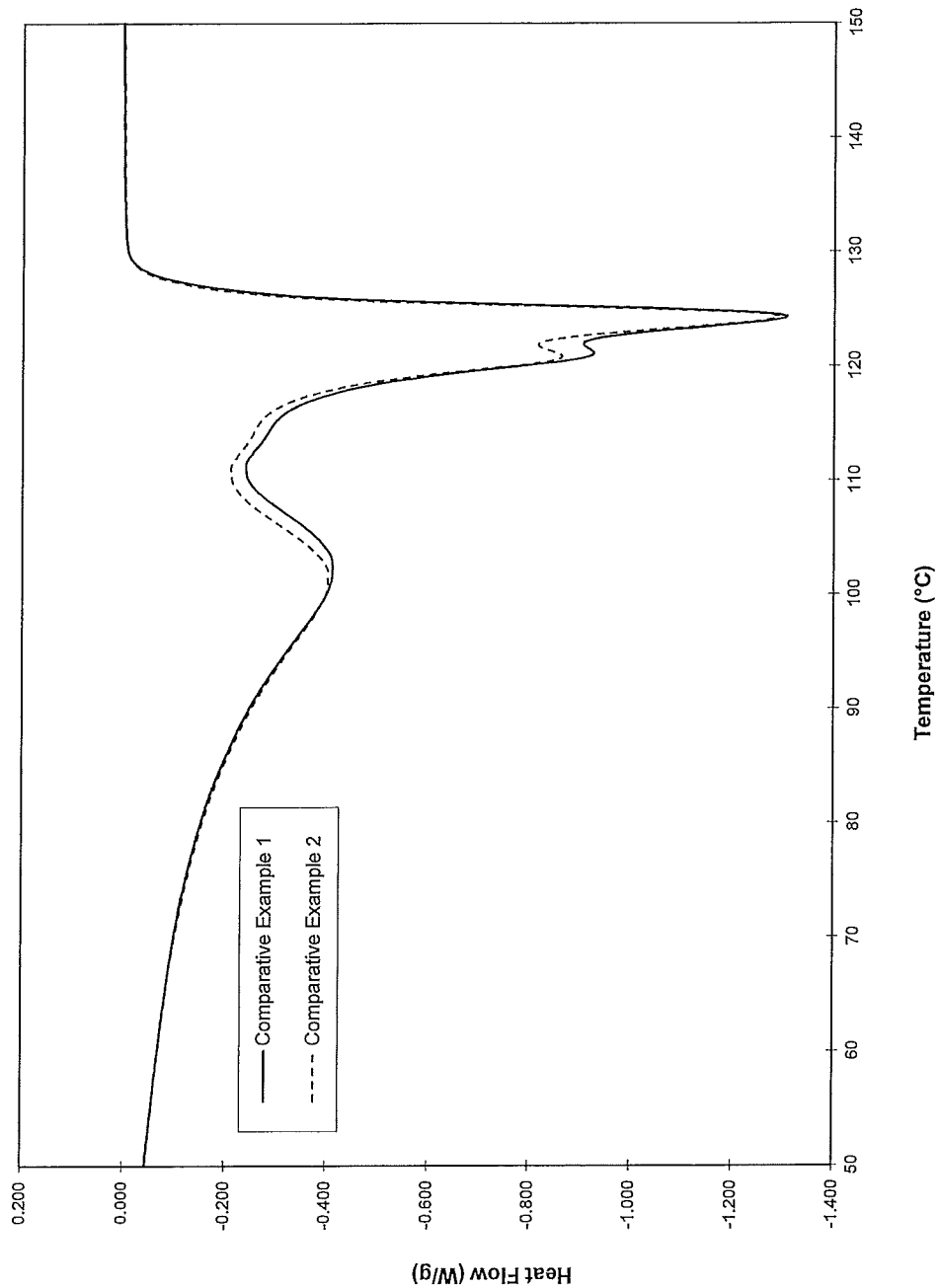
FIG. 6B shows the differential scanning calorimetry analysis (DSC) and profile of comparative polyethylene product compositions.

With reference to FIGS. 6A and 6B, a person skilled in the art will recognize that the inventive polyethylene product compositions have a multimodal DSC profile. For examples 1, 2, 3, 4 and 5 the DSC profile is at least trimodal.

Blown films were generated by using a 2.5-inch Gloucester blown film line (L/D=24) with a die diameter of 4-inch. The die was coated with polymer processing aid (PPA) by spiking the line with a high concentration of PPA masterbatch to avoid melt fracture. The fixed conditions were die gap of 35 mils (0.0889 cm), frost line height of about 17 inches and output of 100 lbs/hr. Films were collected under different orientation conditions. The monolayer 1-mil film was produced with a blow up ratio (BUR) of 2.5 and the 1-mil films were used for obtaining the physical properties of the films. The monolayer 2-mil film (BUR=2.5) was used for obtaining the cold-seal and hot tack profiles. Data for film blown from the polyethylene product compositions of the present disclosure is provided in Table 4, along with data for films made from various comparative resins.

Comparative Example A is a film made from FP117-C™, a resin commercially available from the NOVA Chemicals Company. FP117-C™ has a density of 0.917 g/cm$^3$ and a melt index $I_2$ of 1 dg/min. Comparative Example B is a film made from Exceed 1018CA™, a resin commercially available from ExxonMobil. Exceed 1018CA™ has a density of about 0.918 g/cm$^3$ and a melt index $I_2$ of about 0.94 dg/min. Comparative Example C is a film made from Marlex D139™, a resin commercially available from ChevronPhillips. Marlex D139™ has a density of about 0.918 g/cm$^3$ and a melt index $I_2$ of about 0.9 dg/min. Comparative Example D is a film made from Elite 5400G™, a resin commercially available from the Dow Chemical Company. Elite 5400G™ has a density of about 0.916 g/cm$^3$ and a melt index $I_2$ of about 1 dg/min. Comparative Example E is a film made from a resin made according to US Pat. Appl. No. 2016/0108221. The resin has a density of about 0.917 g/cm$^3$, a melt index $I_2$ of about 0.96 dg/min, and is made in a multi reactor solution process in which a first reactor and a second reactor are configured in series with one another. The resin is an ethylene/1-octene copolymer. In Table 4, Comparative Examples 1 and 2 are films which were made from Comparative polyethylenes 1 and 2. As already described above, these comparative resins were made using a three reactor process, in which the first and second reactors are configured in parallel, but in which ethylene monomer was not added to the third reactor. In Table 4, the Inventive Examples 1-5, are films made from the Inventive polyethylene product compositions 1-5

TABLE 4

|  | Comp. A | Comp. B | Comp. C | Comp. D | Comp. E | Comp. 1 |
|---|---|---|---|---|---|---|
| Film Physical Properties | | | | | | |
| Thickness Profile Ave | 1.01 | 1.01 | 1.03 | 1.03 | 1.04 | 1.03 |
| Film Toughness | | | | | | |
| Dart Impact (g/mil) | 470 | 827 | 688 | 818 | 812 | 677 |
| Slow Puncture - Lube/Tef (J/mm) | 85 | 80 | 77 | 63 | 98 | 56 |
| Puncture (J/mm) | | | | 97 | 66 | |
| Film Tear Resistance | | | | | | |
| Tear - MD (g/mil) | 308 | 241 | 186 | 247 | 293 | 248 |
| Tear - TD (g/mil) | 516 | 358 | 454 | 485 | 540 | 392 |
| Film Stiffness | | | | | | |
| 1% Sec Modulus - MD (Mpa) | 129 | 156.8 | 177.6 | 165 | 150.4 | 187.6 |
| 1% Sec Modulus - TD (Mpa) | 131.4 | 168.8 | 185 | 175 | 167.8 | 238.8 |
| 2% Sec Modulus - MD (Mpa) | 117 | 150.2 | 166.4 | 151 | 141.4 | 184.4 |
| 2% Sec Modulus - TD (Mpa) | 123.8 | 161.4 | 170.2 | 155 | 149.2 | 227.4 |
| Film Tensile Strength | | | | | | |
| Tensile Break Str - MD (Mpa) | 46.4 | 50.7 | 47.8 | 44 | 45.4 | 34.9 |
| Tensile Break Str - TD (Mpa) | 48 | 61.1 | 47.8 | 45.5 | 44.6 | 43 |
| Elongation at Break - MD (%) | 534 | 566 | 505 | 486 | 521 | 506 |
| Elongation at Break - TD (%) | 796 | 741 | 692 | 725 | 747 | 663 |
| Tensile Yield Str - MD (Mpa) | 8.8 | 9.7 | 10.1 | 9.1 | 9.1 | 10.9 |
| Tensile Yield Str - TD (Mpa) | 8.8 | 9.9 | 9.2 | 8.7 | 8.9 | 11.6 |
| Tensile Elong at Yield - MD (%) | 22 | 15 | 16 | 13 | 13 | 18 |
| Tensile Elong at Yield - TD (%) | 17 | 14 | 12 | 13 | 14 | 13 |
| Film Opticals | | | | | | |
| Gloss at 45° | 50 | 39 | 84 | 64 | 72 | 63 |
| Haze (%) | 12 | 16.2 | 3.3 | 7.8 | 5.8 | 8.7 |
| Cold Seal Properties | | | | | | |
| S.I.T. @ 8.8N Seal Strength (° C.) | 98.8 | 102.8 | 102.4 | 100.4 | 98.2 | 107 |
| Max Force (N) | 19.9 | 206 | 23.4 | 24.9 | 23.7 | 20.1 |
| Temp. @ Max Force (° C) | 130 | 140 | 120 | 150 | 160 | 160 |
| Hot Tack Properties | | | | | | |
| Tack Onset @ 1.0N (° C.) - 2 mil film | 100.5 | 101.2 | 98.6 | 92.5 | 95.4 | 98.1 |
| Max Hottack Strength (N) - 2 mil film | 4.1 | 5.3 | 5.7 | 5.4 | 4.4 | 4.5 |
| Temperature - Max. Hottack (° C.) - 2 mil film | 115 | 120 | 120 | 110 | 115 | 120 |

| Example No. | Comp. 2 | Inv. 1 | Inv. 2 | Inv. 3 | Inv. 4 | Inv. 5 |
|---|---|---|---|---|---|---|
| Film Physical Properties | | | | | | |
| Thickness Profile Ave | 1.04 | 1.04 | 1.01 | 1.01 | 0.99 | 1.02 |
| Film Toughness | | | | | | |
| Dart Impact (g/mil) | 918 | 712 | 722 | 646 | 658 | 790 |
| Slow Puncture - Lube/Tef (J/mm) | 86 | 82 | 67 | 72 | 70 | 77 |
| Puncture (J/mm) | | | 119 | | 111 | 129 |
| Film Tear Resistance | | | | | | |
| Tear - MD (g/mil) | 251 | 306 | 294 | 338 | 282 | 337 |
| Tear - TD (g/mil) | 477 | 493 | 521 | 551 | 570 | 597 |
| Film Stiffness | | | | | | |
| 1% Sec Modulus - MD (Mpa) | 199.8 | 191.6 | 198 | 184 | 176 | 204 |
| 1% Sec Modulus - TD (Mpa) | 254.4 | 246.2 | 358 | 232.8 | 217 | 244 |
| 2% Sec Modulus - MD (Mpa) | 181.4 | 179 | 232 | 166 | 158 | 179 |
| 2% Sec Modulus - TD (Mpa) | 218.4 | 213.2 | 268 | 205.6 | 180 | 206 |
| Film Tensile Strength | | | | | | |
| Tensile Break Str - MD (Mpa) | 42.8 | 46.3 | 57.2 | 41.6 | 55.2 | 58.8 |
| Tensile Break Str - TD (Mpa) | 52.5 | 56.2 | 50.2 | 55.6 | 50.8 | 47.1 |
| Elongation at Break - MD (%) | 536 | 548 | 652 | 552 | 626 | 644 |
| Elongation at Break - TD (%) | 730 | 744 | 803 | 770 | 790 | 792 |
| Tensile Yield Str - MD (Mpa) | 10 | 10.1 | 9.9 | 9.5 | 10.8 | 12.1 |
| Tensile Yield Str - TD (Mpa) | 10.7 | 10.4 | 10.4 | 10.6 | 12.6 | 11.9 |
| Tensile Elong at Yield - MD (%) | 14 | 14 | 17 | 14 | 14 | 12 |
| Tensile Elong at Yield - TD (%) | 12 | 11 | 15 | 13 | 12 | 13 |
| Film Opticals | | | | | | |
| Gloss at 45° | 68 | 59 | 59 | 56 | 57 | 49 |
| Haze (%) | 7.5 | 9.1 | 9.6 | 9.9 | 10.2 | 13.1 |

TABLE 4-continued

| Cold Seal Properties | | | | | | |
|---|---|---|---|---|---|---|
| S.I.T. @ 8.8N Seal Strength (° C.) | 111.2 | 102.5 | 102 | 102.1 | 97.8 | 100.5 |
| Max Force (N) | 18.3 | 19.1 | 22.9 | 20.4 | 22.6 | 24 |
| Temp. @ Max Force (° C.) | 150 | 150 | 150 | 130 | 130 | 150 |
| Hot Tack Properties | | | | | | |
| Tack Onset @ 1.0N (° C.) - 2 mil film | 97.2 | 95.6 | 95.7 | 94 | 92.9 | 91.6 |
| Max Hottack Strength (N) - 2 mil film | 4.1 | 5.1 | 4.9 | 5.3 | 4.5 | 4.9 |
| Temperature - Max. Hottack (° C.) - 2 mil film | 115 | 115 | 115 | 120 | 120 | 120 |

The data provided in Table 4 demonstrate that the inventive polyethylene product compositions have a good balance of film properties, including good dart impact, stiffness, puncture, tear and sealing properties. Films made from the inventive polyethylene products also have good tensile strength and optical properties.

Finally, films made from the inventive polyethylene products also have good hot tack performance. Without wishing to be bound by theory, in the hot tack profile (seal temperature vs. force), good hot tack performance is indicated by an early (or low) hot tack initiation temperature, then a relatively high force over a wide range of seal temperatures. See for example the shape the curves in FIG. 7A for inventive compositions 1, 2, 3, 4 and 5, relative to comparative resins 1 and 2 and comparative resins A, B, C, and D, in FIG. 7B. The shape of the hot tack curve for inventive composition 5, is particularly good and has an early hot tack initiation temperature combined by a high force over a wide range of seal temperatures.

Figure 8A:
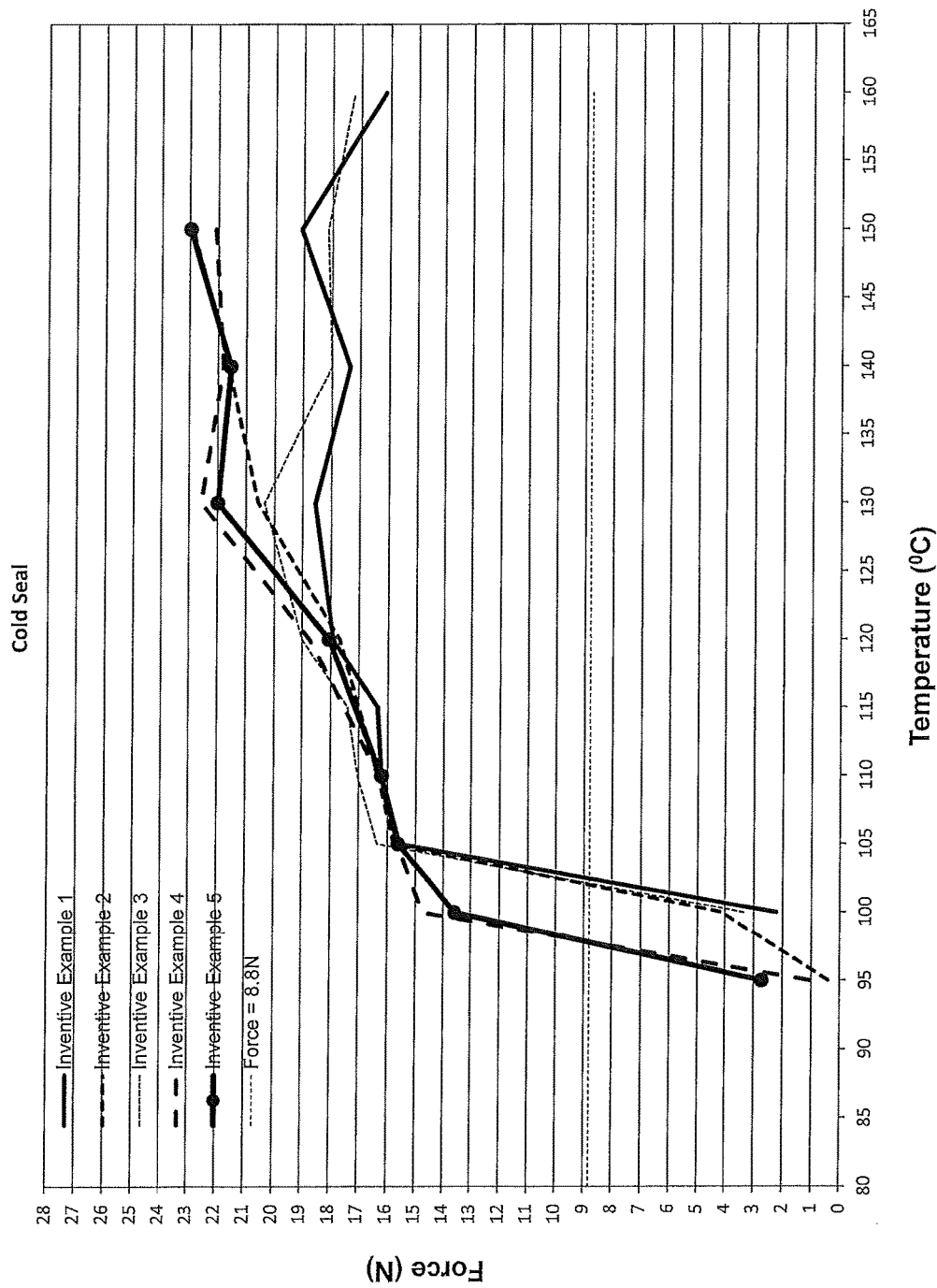
FIG. 8A shows the cold seal profiles for the films made using the polyethylene product compositions made according to the present invention.

Good cold seal properties are evidenced by the curves given in FIG. 8A for the inventive polyethylene compositions. The cold seal properties of some comparative polyethylene compositions are provided in Table 8B. A person skilled in the art will recognize that inventive example 5, has an early cold seal initiation temperature in combination with a relatively high force over a wide range of cold seal temperatures.

Non-limiting embodiments of the present disclosure include the following:

Embodiment A

A continuous solution polymerization process comprising:
injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;
passing the first exit stream and the second exit stream into a third reactor and injecting into the third reactor, ethylene, and optionally each of:
a process solvent,
one or more α-olefins,
hydrogen and
a second catalyst system,
to produce a third exit stream containing a final polyethylene product;
passing the third exit stream to a devolatilization system to recover the final polyethylene product; wherein the first reactor is operated at lower temperature than the second reactor;

the first catalyst system is a single site catalyst system; and
if injected into the third reactor, the second catalyst system is a single site catalyst system or a Ziegler-Natta catalyst system.

Embodiment B

The process of Embodiment A wherein the first catalyst system is a single site catalyst system comprising:
a) a phosphinimine complex defined by the formula $$(L^A)_a M(Pl)_b (Q)_n$$

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;
b) an alkylaluminoxane co-catalyst;
c) an ionic activator, and;
d) optionally, a hindered phenol.

Embodiment C

The process of Embodiment B wherein the alkylaluminoxane co-catalyst is methylaluminoxane (MAO).

Embodiment D

The process of Embodiment C wherein the ionic activator is trityl tetrakis (pentafluoro-phenyl) borate.

Embodiment E

The process of Embodiment A, B, C, or D wherein at least 10 weight percent of the total ethylene injected into reactor 1, reactor 2 and reactor 3, is injected into reactor 3.

Embodiment F

The process of Embodiment A, B, C, or D wherein at least 20 weight percent of the total ethylene injected into reactor 1, reactor 2 and reactor 3, is injected into reactor 3.

Embodiment G

The process of Embodiment A, B, C, D, E, or F wherein the first, second and third reactors operate at a temperature from about 80° C. to about 300° C. and a pressure from about 3 MPag to about 45 MPag.

Embodiment H

The process of Embodiment A, B, C, D, E, F, or G wherein the first reactor operates at a temperature at least 25° C. lower than the temperature at which the second reactor operates.

Embodiment I

The process of Embodiment A, B, C, D, E, F, or G wherein the first reactor operates at a temperature at least 45° C. lower than the temperature at which the second reactor operates.

Embodiment K

The process of Embodiment A, B, C, D, E, F, or G wherein the first reactor operates at a temperature of from about 10° C. to about 100° C. lower than the temperature at which the second reactor operates.

Embodiment L

The process of Embodiment A, B, C, D, E, F, or G wherein the first reactor operates at a temperature of from about 125° C. to about 155° C. and the second reactor operates at a temperature of from about 185° C. to about 205° C.

Embodiment M

The process of Embodiment A, B, C, D, E, F, G, H, I, J, K, or L wherein one or more α-olefins is fed exclusively to the first reactor.

Embodiment N

The process of Embodiment A, B, C, D, E, F, G, H, I, J, K, L, or M wherein a second catalyst is fed to the third reactor.

Embodiment O

The process of Embodiment A, B, C, D, E, F, G, H, I, J, K, L, M, or N wherein the first reactor and the second reactor are continuously stirred tank reactors.

Embodiment P

The process of Embodiment A, B, C, D, E, F, G, H, I, J, K, L, M, N, or O wherein the third reactor is a tubular reactor.

Embodiment Q

The process of Embodiment N wherein the second catalyst system is a single site catalyst system comprising:
a) a phosphinimine complex defined by the formula

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;
b) an alkylaluminoxane co-catalyst;
c) an ionic activator, and;
d) optionally, a hindered phenol.

Embodiment R

The process of Embodiment N wherein the second catalyst system is a Ziegler-Natta catalyst system.

Embodiment S

The process of Embodiment A, B, C, D, E, F, G, H, I, J, K, L, M, N, O, P, Q, or R wherein the process solvent is one or more $C_5$ to $C_{12}$ alkanes.

Embodiment T

The process of Embodiment A, B, C, D, E, F, G, H, I, J, K, L, M, N, O, P, Q, R, or S wherein the one or more α-olefins are $C_3$ to $C_{10}$ α-olefins.

Embodiment U

The process of Embodiment A, B, C, D, E, F, G, H, I, J, K, L, M, N, O, P, Q, R, S, or T wherein the one or more α-olefins are 1-hexene or 1-octene or a mixture of 1-hexene and 1-octene.

Embodiment V

The process of Embodiment A, B, C, D, E, F, G, H, I, J, K, L, M, N, O, P, Q, R, S, T, or U wherein the first exit stream and the second exit stream are combined upstream of the third reactor.

Embodiment W

A polyethylene product produced according to Embodiment A, B, C, D, E, F, G, H, I, J, K, L, M, N, O, P, Q, R, S, T, U, or V.

Embodiment X

A continuous solution polymerization process comprising: injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;

passing the first exit stream into a third reactor and injecting into the third reactor, ethylene, and optionally each of:
  a process solvent,
  one or more α-olefins,
  hydrogen and
  a second catalyst system,
to produce a third exit stream;
  combining the second exit stream with the third exit stream to produce a final product stream containing a final polyethylene product;
  passing the final product stream to a devolatilization system to recover the final polyethylene product; wherein
  the first reactor is operated at lower temperature than the second reactor;
  the first catalyst system is a single site catalyst system; and
  if injected into the third reactor, the second catalyst system is a single site catalyst system or a Ziegler-Natta catalyst system.

Embodiment Y

A continuous solution polymerization process comprising: injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;

passing the second exit stream into a third reactor and injecting into the third reactor, ethylene, and optionally each of:
  a process solvent,
  one or more α-olefins,
  hydrogen and
  a second catalyst system,
to produce a third exit stream;
  combining the first exit stream with the third exit stream to produce a final product stream containing a final polyethylene product;
  passing the final product stream to a devolatilization system to recover the final polyethylene product; wherein
  the first reactor is operated at lower temperature than the second reactor;
  the first catalyst system is a single site catalyst system; and
  if injected into the third reactor, the second catalyst system is a single site catalyst system or a Ziegler-Natta catalyst system.

What is claimed is:

1. A continuous solution polymerization process comprising:
  injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;
  passing the first exit stream and the second exit stream into a third reactor and injecting into the third reactor, ethylene, and optionally each of:
    a process solvent,
    one or more α-olefins,
    hydrogen and
    a second catalyst system,
  to produce a third exit stream containing a final polyethylene product;
  passing the third exit stream to a devolatilization system to recover the final polyethylene product; wherein
  the first reactor is operated at lower temperature than the second reactor;
  the first catalyst system is a single site catalyst system; and
  if injected into the third reactor, the second catalyst system is a single site catalyst system or a Ziegler-Natta catalyst system.

2. The process of claim 1 wherein the first catalyst system is a single site catalyst system comprising:
  a) a phosphinimine complex defined by the formula $(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;
  b) an alkylaluminoxane co-catalyst;
  c) an ionic activator, and;
  d) optionally, a hindered phenol.

3. The process of claim 2 wherein the alkylaluminoxane co-catalyst is methylaluminoxane (MAO).

4. The process of claim 3 wherein the ionic activator is trityl tetrakis (pentafluoro-phenyl) borate.

5. The process of claim 1 wherein at least 10 weight percent of the total ethylene injected into reactor 1, reactor 2 and reactor 3, is injected into reactor 3.

6. The process of claim 1 wherein at least 20 weight percent of the total ethylene injected into reactor 1, reactor 2 and reactor 3, is injected into reactor 3.

7. The process of claim 1 wherein the first, second and third reactors operate at a temperature from about 80° C. to about 300° C. and a pressure from about 3 MPag to about 45 MPag.

8. The process of claim 1 wherein the first reactor operates at a temperature at least 25° C. lower than the temperature at which the second reactor operates.

9. The process of claim 1 wherein the first reactor operates at a temperature at least 45° C. lower than the temperature at which the second reactor operates.

10. The process of claim 1 wherein the first reactor operates at a temperature of from about 10° C. to about 100° C. lower than the temperature at which the second reactor operates.

11. The process of claim 1 wherein the first reactor operates at a temperature of from about 125° C. to about 155° C. and the second reactor operates at a temperature of from about 185° C. to about 205° C.

12. The process of claim 1 wherein one or more α-olefins is fed exclusively to the first reactor.

13. The process of claim 1 wherein a second catalyst is fed to the third reactor.

14. The process of claim 1 wherein the first reactor and the second reactor are continuously stirred tank reactors.

15. The process of claim 14 wherein the third reactor is a tubular reactor.

16. The process of claim 13 wherein the second catalyst system is a single site catalyst system comprising:

a) a phosphinimine complex defined by the formula $$(L^A)_a M(Pl)_b (Q)_n$$

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal selected from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;

b) an alkylaluminoxane co-catalyst;
c) an ionic activator, and;
d) optionally, a hindered phenol.

17. The process of claim 13 wherein the second catalyst system is a Ziegler-Natta catalyst system.

18. The process of claim 1 wherein the process solvent is one or more $C_5$ to $C_{12}$ alkanes.

19. The process of claim 1 wherein the one or more α-olefins are $C_3$ to $C_{10}$ α-olefins.

20. The process of claim 1 wherein the one or more α-olefins are 1-hexene or 1-octene or a mixture of 1-hexene and 1-octene.

21. The process of claim 1 wherein the first exit stream and the second exit stream are combined upstream of the third reactor.

22. A continuous solution polymerization process comprising:
injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;
passing the first exit stream into a third reactor and injecting into the third reactor, ethylene, and optionally each of:
a process solvent,
one or more α-olefins,
hydrogen and
a second catalyst system,
to produce a third exit stream;
combining the second exit stream with the third exit stream to produce a final product stream containing a final polyethylene product;
passing the final product stream to a devolatilization system to recover the final polyethylene product;
wherein
the first reactor is operated at lower temperature than the second reactor;
the first catalyst system is a single site catalyst system; and
if injected into the third reactor, the second catalyst system is a single site catalyst system or a Ziegler-Natta catalyst system.

23. A continuous solution polymerization process comprising:
injecting ethylene, a process solvent, a first catalyst system, optionally one or more α-olefins and optionally hydrogen into each of a first reactor and a second reactor configured in parallel to each other to produce a first exit stream containing a first polyethylene made in the first reactor and a second exit stream containing a second polyethylene made in the second reactor;
passing the second exit stream into a third reactor and injecting into the third reactor, ethylene, and optionally each of:
a process solvent,
one or more α-olefins,
hydrogen and
a second catalyst system,
to produce a third exit stream;
combining the first exit stream with the third exit stream to produce a final product stream containing a final polyethylene product;
passing the final product stream to a devolatilization system to recover the final polyethylene product;
wherein
the first reactor is operated at lower temperature than the second reactor;
the first catalyst system is a single site catalyst system; and
if injected into the third reactor, the second catalyst system is a single site catalyst system or a Ziegler-Natta catalyst system.

* * * * *